(12) United States Patent
Kuroda et al.

(10) Patent No.: US 6,470,448 B1
(45) Date of Patent: *Oct. 22, 2002

(54) APPARATUS AND METHOD FOR PROVING TRANSACTION BETWEEN USERS IN NETWORK ENVIRONMENT

(75) Inventors: Yasutsugu Kuroda; Masahiro Komura; Satoru Torii; Shoko Iwase; Etsuo Ono, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/831,328

(22) Filed: Mar. 31, 1997

(30) Foreign Application Priority Data

Oct. 30, 1996 (JP) .............................. 8-288539

(51) Int. Cl.[7] .................................................. H04L 9/00
(52) U.S. Cl. .......................................... 713/176; 705/75
(58) Field of Search ............................ 380/23, 24, 25; 705/26, 37, 39, 44, 64–68, 67, 75, 80, 76; 713/170, 178, 176

(56) References Cited

U.S. PATENT DOCUMENTS

| | | | | |
|---|---|---|---|---|
| 4,458,109 A | * | 7/1984 | Mueller-Schloer | 380/30 |
| 5,615,269 A | * | 3/1997 | Micali | 705/80 |
| 5,659,616 A | * | 8/1997 | Sudia | 705/76 |
| 5,677,955 A | * | 10/1997 | Doggett et al. | 705/76 |
| 5,781,635 A | * | 7/1998 | Chan | 380/30 |
| 5,790,677 A | * | 8/1998 | Fox et al. | 705/78 |
| 5,850,442 A | * | 12/1998 | Muftic | 705/65 |

FOREIGN PATENT DOCUMENTS

JP        6-14018        1/1994

OTHER PUBLICATIONS

Schneier, Bruce. Applied Cryptography: Protocols, Algorithms, and Source Code in C. Oct. 1995. section 5.7. pp. 118–122.*
Mark Gibbs, "A notary for the Net", Dialog, p. 1–2, Sep. 11, 1995.*
Microsoft, "Microsoft Computer Dictionary", p. 140, 1997.*
Bruce Schneier, "Applied Cryptography", p. 39–40, 1996.*
Patent Abstracts of Japan, No. 62–56043, (Mar. 11, 1987).

* cited by examiner

Primary Examiner—Matthew Smithers
(74) Attorney, Agent, or Firm—Staas & Halsey, LLP

(57) ABSTRACT

The digital signatures of users A and B are created for a transaction document which states the contents of a transaction between the users A and B, and they are sent to a transaction proof device of a notary public being a third party, together with the transaction document. Thus, the users A and B and the notary public share information, and the notary public can objectively prove the transactional contents, etc.

25 Claims, 21 Drawing Sheets

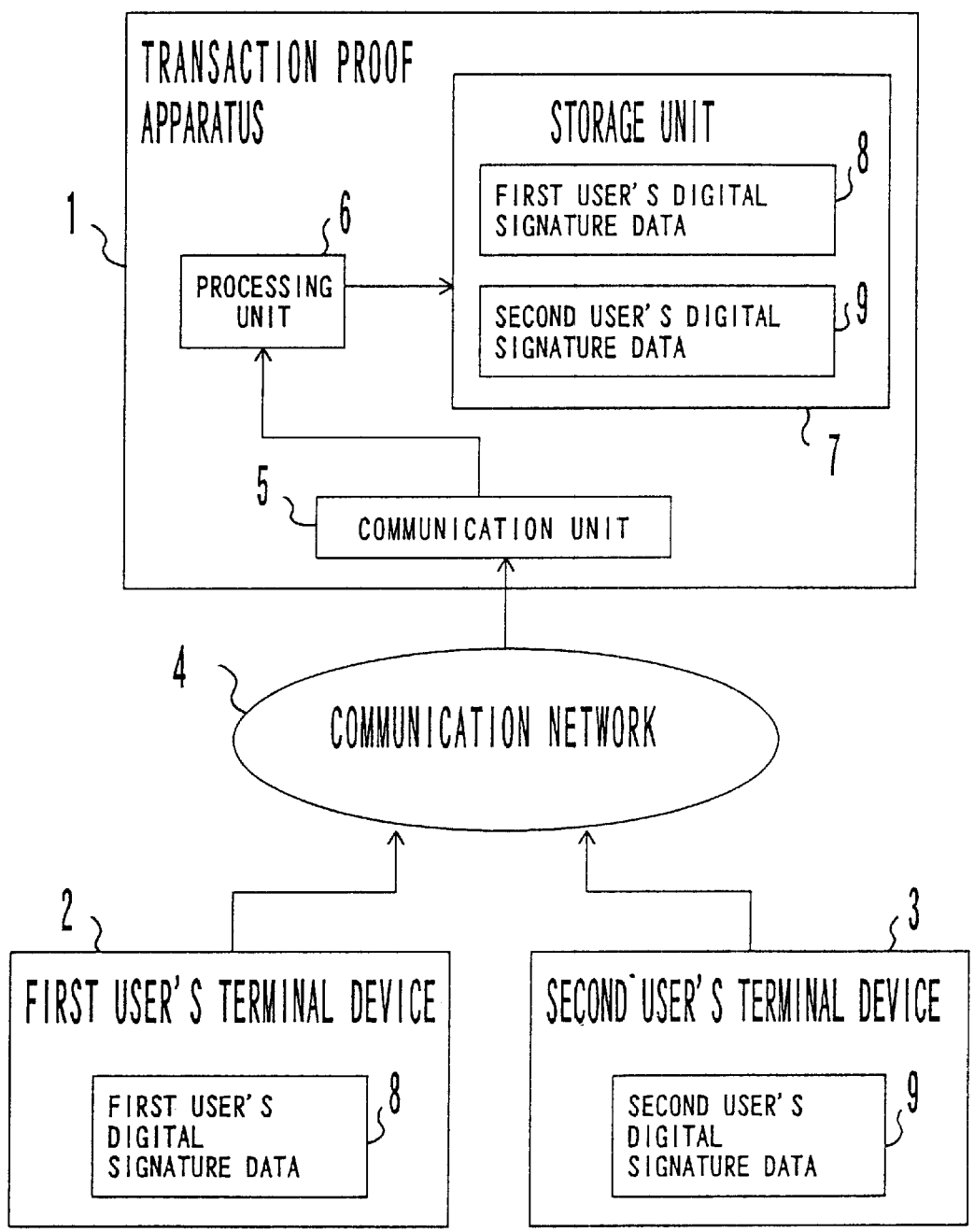
F I G. 1

|  | FIRST MODEL | SECOND MODEL | THIRD MODEL | FOURTH MODEL |
|---|---|---|---|---|
| BASICS | ○ | ○ | ○ | ○ |
| ENCRYPTION | ○ | ○ | ○ | ○ |
| MULTIPLE SIGNATURES | × | ○ | ○ | ○ |
| MULTIPLE SIGNATURES + ENCRYPTION | × | ○ | ○ | ○ |
| INTERACTION | × | ○ | ○ | ○ |
| INTERACTION + ENCRYPTION | × | ○ | ○ | ○ |
| INTERACTION + ENCRYPTION + MULTIPLE SIGNATURES | × | ○ | ○ | ○ |

FIG. 20

APPARATUS AND METHOD FOR PROVING TRANSACTION BETWEEN USERS IN NETWORK ENVIRONMENT

BACKGROUND OF THE INVENTION

1. Field of the Invention

The present invention relates to a transaction proof apparatus and method in which items on a transaction, such as the contents of the transaction carried on between at least two interested parties, are objectively proved by utilizing a communication network.

2. Description of the Related Art

Nowadays, with the popularization of the Internet and personal computers, various transactions are being carried on among computers through communication networks. Since, however, basically anybody is free to access the Internet, the identification of the person himself/herself of the opposite communicating party is difficult, and the surreptitious use and alteration of transmission data are also apprehended.

Therefore, contrivances for preventing such dishonest acts are indispensably required for making full-scale commercial dealings in a network environment. Prior-art methods of preventing dishonest acts include the following by way of example:

(a) Electronic Commerce System (Japanese Patent Application Laid-open No. S62-056043)

In creating his/her own digital signature (or electric signature or electronic seal impression), a signer affixes date data indicating the term of validity of the digital signature, to the predetermined position of data for certification. Thus, the signer clearly states the deadline for a reply, to a certifier who has received the digital signature. Concretely, he/she declares that, in the absence of the reply by the deadline, a commercial transaction shall be suspended, the transmitted digital signature being also invalidated.

In a case where the signer has not obtained the reply in spite of the expiration of the term of validity, he/she can invalidate the digital signature by reporting the fact to a notarizing agency together with the digital signature. Thus, even in a case where the certifier of the digital signature has run away with this signature without sending back the reply or where the certifier has transmitted the false signature, the misuse of the particular digital signature can be prevented.

(b) Electronic Notarization Method and Apparatus (Japanese Patent Application Laid-open No. H06-014018)

When an electronic notarization apparatus has been supplied with data from an interested party who desires the proof of the genuineness of the data, a date generator generates date information for appointing a certain point of time which the interested party cannot change. Subsequently, the contents of the data and the date information are encrypted by an encryptor, and the proved genuine data printed with the date are output from a notarization device. Thus, it is permitted to confirm that the missive (or document) or electronically recorded data has/have not been changed since the printed date, and to electronically notarize the genuineness of the missive.

The prior-art methods of preventing dishonest acts as explained above, however, involve problems as stated below.

According to the electronic commerce system, the term of validity of the digital signature can be notified to the opposite party of the transaction, thereby preventing the misuse of the signature. With this system, however, it is impossible to identify the opposite party of the transaction or to prevent the alteration of the contents of the transaction.

On the other hand, according to the electronic notarization method, the notarization apparatus can electronically notarize the genuineness of the missive by affixing the date information to this missive. Since, however, the notarization apparatus proves the genuineness of the data that has been input by the sole interested party, it cannot decide if the data has been altered before the input operation. Consequently, incorrect contents might be output as the genuine data in cases of the transaction missive etc. between two parties.

Accordingly, the known method has the problem that a malicious user might misrepresent transactional contents etc., so the commercial transaction utilizing the network is not always carried on with safety.

Meanwhile, transactions in a commodity exchange are administered in the following aspect: The transactions of commodities, such as forward bargains, are all carried on in the commodity exchange. The interested parties of the transactions become the members thereof, and they pay a predetermined amount of guaranty money beforehand. Herein, in a case where a malpractice has been committed, the guaranty money is confiscated.

The transactions in the commodity exchange, however, are different from the general transactions between enterprises and are difficult to direct applications to the commercial transactions on the network.

SUMMARY OF THE INVENTION

An object of the present invention is to provide a transaction proof apparatus and method with which the safety of a transaction to be carried on between at least two interested parties is guaranteed by utilizing a communication network.

A transaction proof system according to the present invention comprises a transaction proof apparatus and terminal devices which belong to first and second users. It will process information on a transaction which is carried on between or among a plurality of users. The transaction proof apparatus and each terminal device are interconnected by a communication network.

The first user's terminal device creates the digital signature data of the first user for transaction document (or transaction missive) data which state items on the transaction between the first and second users, while the second user's terminal device creates the digital signature data of the second user for the particular transaction document data. The digital signature data of the first and second users are respectively transmitted to the transaction proof apparatus through the network.

The transaction proof apparatus is equivalent to an information processing equipment belonging to a third party (or a disinterested party), and it includes a communication unit, a processing unit and a storage unit. The communication unit is connected to the network, and it receives the digital signature data of the first user and those of the second user from the network. The processing unit verifies the first user's and second user's digital signature data, while the storage unit stores them therein.

The digital signature of any user can be created solely by the user himself/herself. Therefore, when the user's digital signature has been affixed to the transaction document data, the contents of the transaction are regarded as having been approved by the particular user.

Upon receiving the digital signature data through the communication unit, the processing unit decrypts the respective digital signature data by use of public keys belonging to the first and second users, and it verifies the contents of both the digital signature data.

If the contents of both the digital signature data are the same, the processing unit deems that both the first and second users have agreed on the transaction, and it retains these digital signature data in the storage unit as the evidence of the agreement. In contrast, if the contents of both the digital signature data are discrepant, the processing unit deems that the transaction has ended in failure, and it notifies an error to the first user's and second user's terminal devices.

BRIEF DESCRIPTION OF THE DRAWINGS

FIG. 1 is a principle diagram of a transaction proof system according to the present invention;

FIG. 20 is a table showing the models of the transaction notarization system.

DESCRIPTION OF THE PREFERRED EMBODIMENTS

Figure 2:
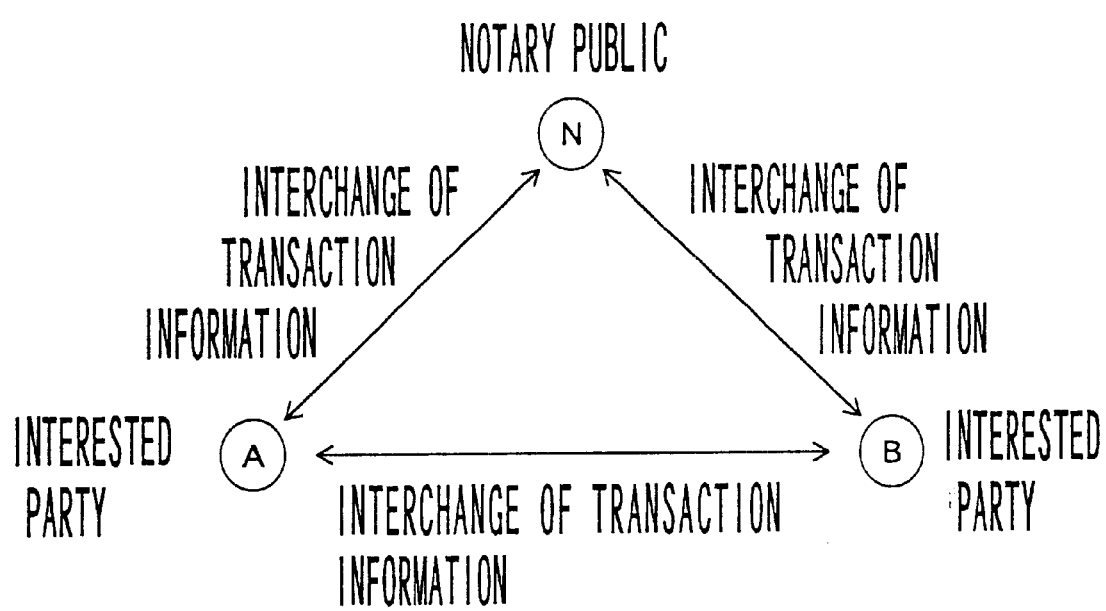
FIG. 2 is a diagram showing the environment of a commercial transaction on a network.

Now, the aspects of performance of the present invention will be described in detail with reference to the drawings.

FIG. 1 is a principle diagram of a transaction proof system according to the present invention. The transaction proof system shown in FIG. 1 comprises a transaction proof apparatus 1, a terminal device 2 belonging to a first user, and a terminal device 3 belonging to a second user, and it executes information processing on a transaction which is carried on between or among a plurality of users. The transaction proof apparatus 1 and the terminal devices 2, 3 are interconnected by a communication network 4.

The terminal device 2 creates the digital signature data 8 of the first user for transaction document data which state items on the transaction between the first and second users, while the terminal device 3 creates the digital signature data 9 of the second user for the particular transaction document data. The digital signature data 8 and 9 are transmitted to the transaction proof apparatus 1 through the network 4.

The transaction proof apparatus 1 is equivalent to an information processing equipment belonging to a third party (or a disinterested party), and it includes a communication unit 5, a processing unit 6 and a storage unit 7.

The communication unit 5 is connected to the network 4, and it receives the first user's digital signature data 8 and the second user's digital signature data 9 from the network 4.

The processing unit 6 verifies the first user's digital signature data 8 and second user's digital signature data 9, while the storage unit 7 stores these data 8 and 9 therein.

The expression "digital signature" signifies information which the transmitter of data has created by encrypting the data in conformity with any method and by use of a secret key known to only the transmitter himself/herself. Here, the first user's digital signature data 8 are created using the secret key of the first user, while the second user's digital signature data 9 are created using the secret key of the second user.

The digital signature of any user can be created solely by the user himself/herself. Therefore, when the user's digital signature has been affixed to the transaction document data, the contents of the transaction are regarded as having been approved by the particular user.

Upon receiving the digital signature data 8 and 9 through the communication unit 5, the processing unit 6 decrypts the respective digital signature data 8 and 9 by use of public keys belonging to the first and second users, and it verifies the contents of the digital signature data 8 and 9.

If the contents of both the digital signature data 8 and 9 are the same, the processing unit 6 deems that both the first and second users have agreed on the transaction, and it retains these digital signature data 8 and 9 in the storage unit 7 as the evidence of the agreement. In contrast, if the contents of both the digital signature data 8 and 9 are discrepant, the processing unit 6 deems that the transaction has ended in failure, and it notifies an error to the first user's and second user's terminal devices 2, 3.

When the transaction proof apparatus 1 of the third party, who is different from the interested parties of the transaction, saves the digital signature data 8 and 9 in this manner, it can prove the successful conclusion of the transaction and the contents etc. thereof to other persons or parties anytime. Accordingly, the first and second users being the interested parties of the transaction become unable to misrepresent the items concerning the transaction, and the safety of the transaction in a network environment is objectively guaranteed.

By way of example, the transaction proof apparatus 1 in FIG. 1 corresponds to a notarization device 11 in FIG. 3 to be referred to later. Also, the communication unit 5 corresponds to a network connection device 27 in FIG. 4 to be referred to later, the processing unit 6 corresponds to a CPU (central processing unit) 21 and a memory 22, and the storage unit 7 corresponds to the memory 22 or an external storage device 25.

In general, a commercial or business transaction is successfully concluded with the consent between two interested parties. In order to objectively prove the consent between the interested parties, however, a "trusted third party" is required. The reason therefor is that one of the interested parties can misrepresent the fact in the transaction between only the two parties.

In this aspect of performance, the "trusted third party" shall be called a "notary public" or "notarization authority", and a transaction proof system in which such a notary public guarantees a safe commercial transaction in a network environment shall be called a "transaction notarization system".

In order to carry on the safe commercial transaction in the network environment, the transaction notarization system needs to offer the following services:

(1) Identity Guarantee Service

The notary public guarantees the identity of the opposite party to the transaction. Thus, any false opposite party of the transaction can be detected.

(2) Date-and-Time Guarantee Service

The notary public guarantees the date and time of the transaction. Thus, any party cannot falsify the date and time of the transaction.

(3) Uniqueness Guarantee Service

The notary public guarantees the uniqueness of the transaction. Thus, the confusion of the pertinent transaction with another transaction is prevented.

(4) Delivery Guarantee Service

The notary public guarantees that the information of the transaction has been forwarded without fail. Thus, the sender of the transaction information becomes unable to misrepresent the fact that he/she has sent the information, and also the receiver of the transaction information becomes unable to misrepresent the fact that he/she has received the information. Moreover, when the transaction information has not been forwarded, the place where it has failed to be forwarded can be detected.

(5) Content Guarantee Service

The notary public guarantees the contents of the transaction. Thus, it is permitted to detect that the contents have been altered. Moreover, the transactional contents can be referred to anytime as may be needed.

(6) Transaction Guarantee Service

The notary public guarantees that the specific interested parties have transacted. Thus, the interested parties cannot misrepresent the fact that the transaction has been carried on.

FIG. 2 illustrates the environment of the commercial transaction between two parties on a network. In the figure, by way of example, the interested party A is the first sender of transaction information, while the interested party B is the receiver of the transaction information. The interested parties A and B are carrying on the commercial transaction by mutually interchanging the transaction information of a written sales contract, etc. through the communication network such as the Internet. A notary public (or notarization authority) N interchanges transaction information individually with the interested parties A and B, and it confirms the transaction information of both the parties A and B so as to guarantee the safety of the transaction.

Figure 3:
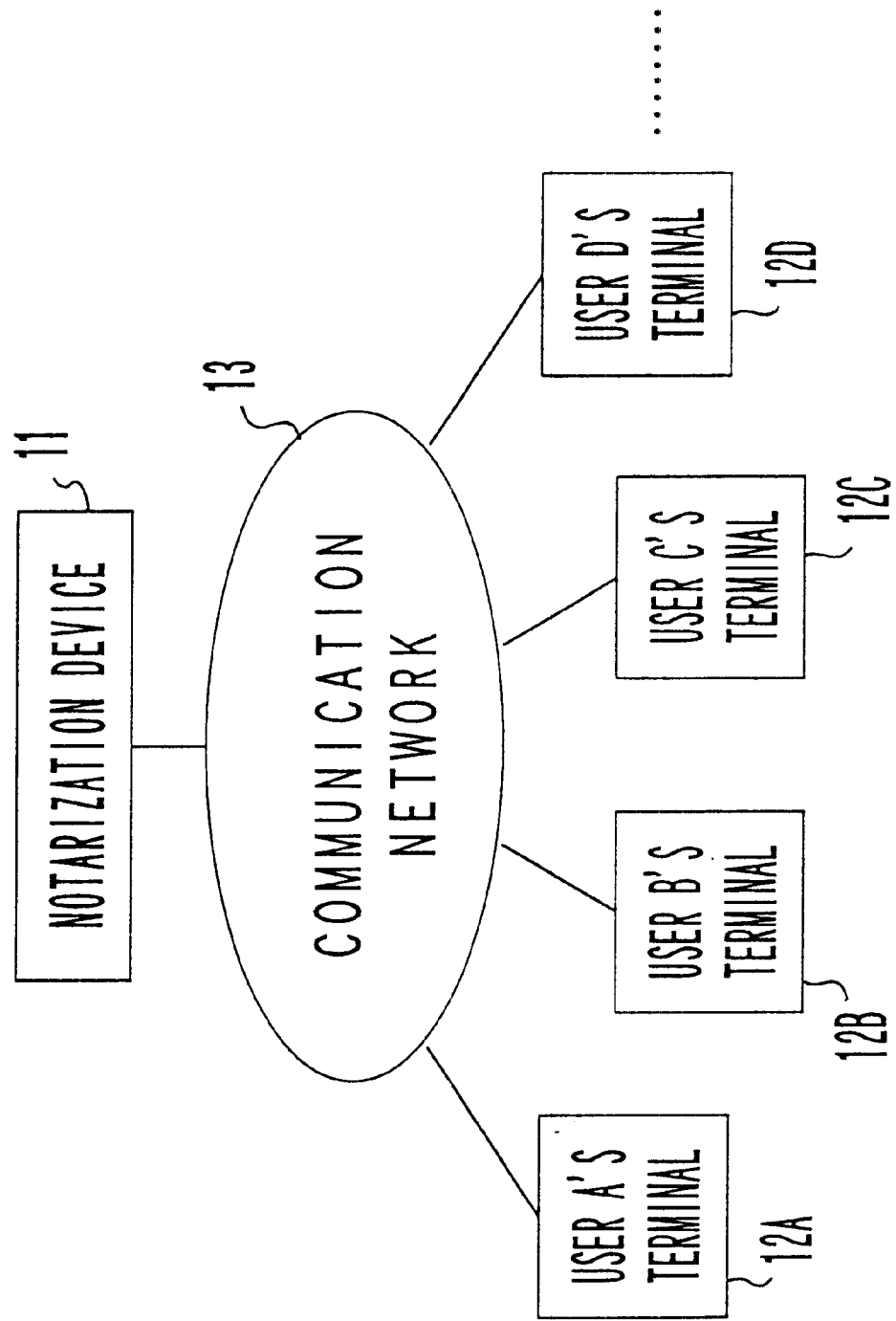
FIG. 3 is a diagram showing a transaction notarization system.

FIG. 3 is an architectural diagram of a transaction notarization system for realizing the commercial transaction environment as illustrated in FIG. 2. The transaction notarization system shown in FIG. 3 comprises a notarization device 11 which is the information processing equipment of a notary public N, and computer terminals 12A, 12B, 12C, 12D, ... of respective users A, B, C, D, .... The notarization device 11 and the terminals 12A, 12B, 12C, 12D, ... are interconnected through a communication network 13.

Figure 4:
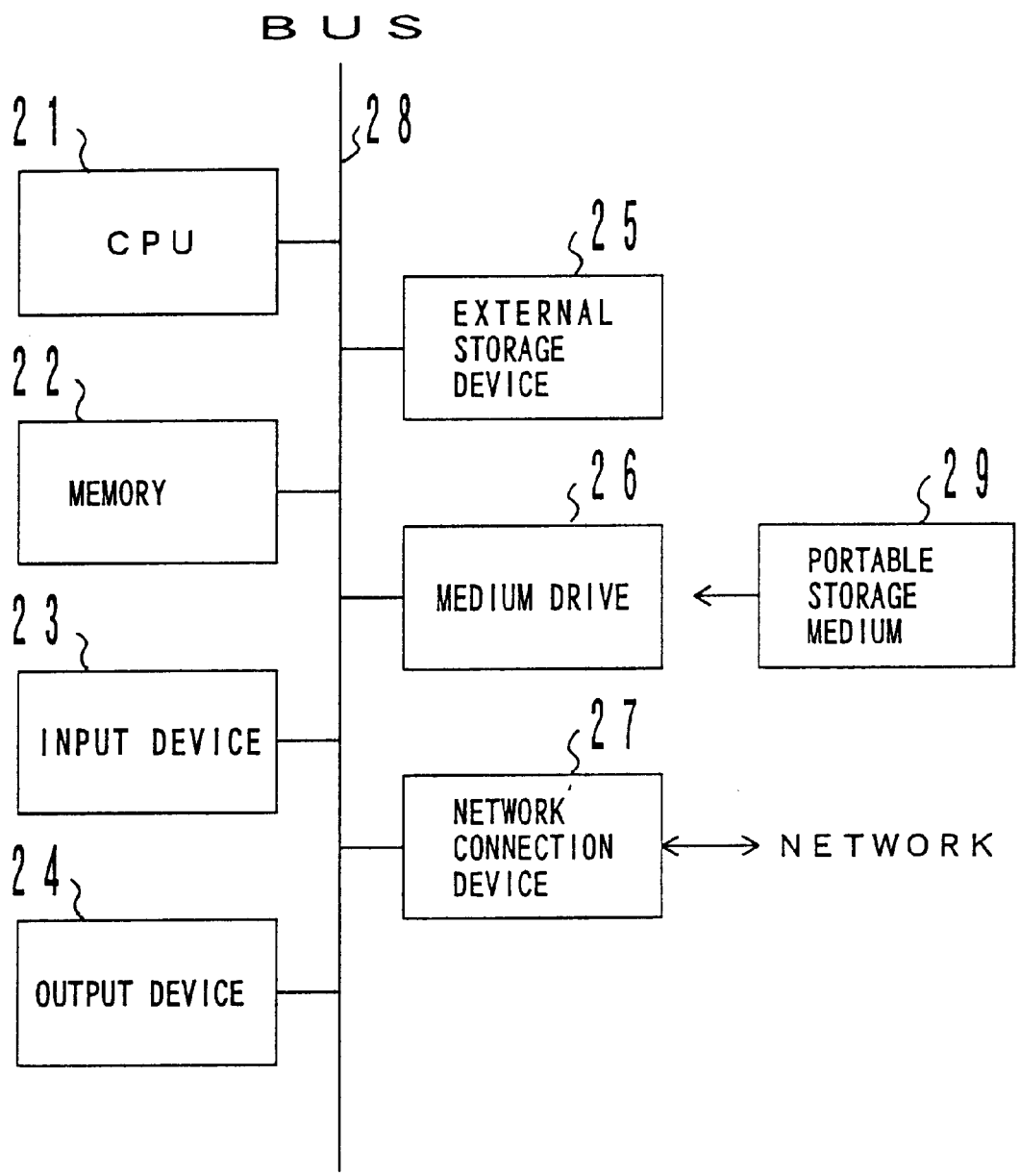
FIG. 4 is a block diagram of an information processing equipment.

FIG. 4 is a block diagram of an information processing equipment which is employed as any of the notarization device 11 and the user terminals 12A, 12B, 12C and 12D illustrated in FIG. 3. The information processing equipment shown in FIG. 4 includes a CPU 21, a memory 22, an input device 23, an output device 24, an external storage device 25, a medium drive 26 and a network connection device 27, and the constituents thereof are interconnected by a bus 28.

The CPU 21 executes programs stored in the memory 22, thereby to incarnate the services stated above. The memory 22 is, for example, a ROM (read-only memory) or a RAM (random access memory).

The input device 22 is equivalent to, for example, a keyboard and a pointing device, and it is used for inputting requests and instructions from the user. The output device 24 is equivalent to a display device, a printer and/or the like, and it is used for outputting transaction information etc.

The external storage device 25 is, for example, a magnetic disk device, an optical disk device or a magneto-optical disk device, and it can retain programs and data therein. It is also used as a database for retaining the transaction information.

The medium drive 26 drives a portable storage medium 29, and can access the stored contents of the medium 29. Usable as the portable storage medium 29 is any desired storage medium which can be read out by a computer, such as a memory card, a floppy disk, a CD-ROM (compact disk read-only memory), an optical disk or a magneto-optical disk. The portable storage medium 29 stores therein programs for incarnating the services stated before, in addition to the data of the transaction information etc.

The network connection device 27 is connected to the communication network 13 (in FIG. 3), and it executes data conversions etc. necessary for communications. The information processing equipment can transmit and receive the transaction information etc. through the network connection device 27.

Among the aforementioned services, the identity guarantee service is equivalent to a seal-impression certification service in the present-day society. The seal-impression certification service is a service for guaranteeing that the interested party of a transaction is a party of good references. The interested party proves his/her identity by registering his/her seal (or signet) with an office (for example, a municipal office) beforehand and affixing the impression of the seal to the document of the transaction.

In order to incarnate such a service on the network, the notary public N proves the propriety of the digital signature. Since the digital signature can be generated by only the party or person himself/herself, it functions similarly to the print of the seal in the network environment.

Concretely, it is possible to utilize the framing of an authentication office recommended by the rules X. 509 of the ITU (International Telecommunication Union). According to the framing, in order to confirm that the interested party is the party of good references, the digital signature may be decrypted using a public key contained in a certificate issued by the authentication office, followed by the verification of the content of the decrypted digital signature. The secret key for use in the generation of the digital signature pairs with the public key stated in the certificate, and the data encrypted with the secret key can be decrypted with the public key.

In addition, the notary public N offers the date-and-time guarantee service in such a way that date-and-time information which expresses the date and time of the transaction is issued to the interested parties. Thus, it is permitted to guarantee the date and time of the transaction, and to avoid the confusion of the contents of the pertinent transaction with those of any past transaction carried on between the same interested parties.

Further, the notary public N offers the uniqueness guarantee service by issuing a transaction ID to the interested parties as the identifier of the transaction. Thus, it is permitted to properly identify each transaction and to avoid the confusion of the contents of the pertinent transaction with those of any other transaction.

Besides, the delivery guarantee service can be incarnated using a non-repudiation mechanism which is standardized by the rules CD13888-1, 2, 3 of the ISO (International Standardization Organization)/IEC (International Electrotechnical Commission). The non-repudiation mechanism issues token information serving as the evidence of delivery and confirms it in compliance with the user's request, thereby to prove that a message has been delivered. In the ensuing description, the delivery guarantee service shall not be detailed.

Next, the aspects of performance of the content guarantee service will be described with reference to FIGS. 5 through 10.

In guaranteeing the contents of transaction information which is interchanged between two interested parties, the following service requisites are considered:

[1] The digital signature of a sender is affixed to the contents of a transaction in order to guarantee that the sender has confirmed the transactional contents.

[2] The digital signature of a receiver is affixed to the transactional contents in order to guarantee that the receiver has confirmed these transactional contents.

[3] The sender, the receiver and a notary public N share (or hold in common) the transaction information bearing the sender's and receiver's digital signatures, in order to finally guarantee that the sender and the receiver have confirmed the transactional contents.

[4] The notary public N accumulates the transactional contents in order to guarantee that these transactional contents can be referred to anytime.

Figure 5:
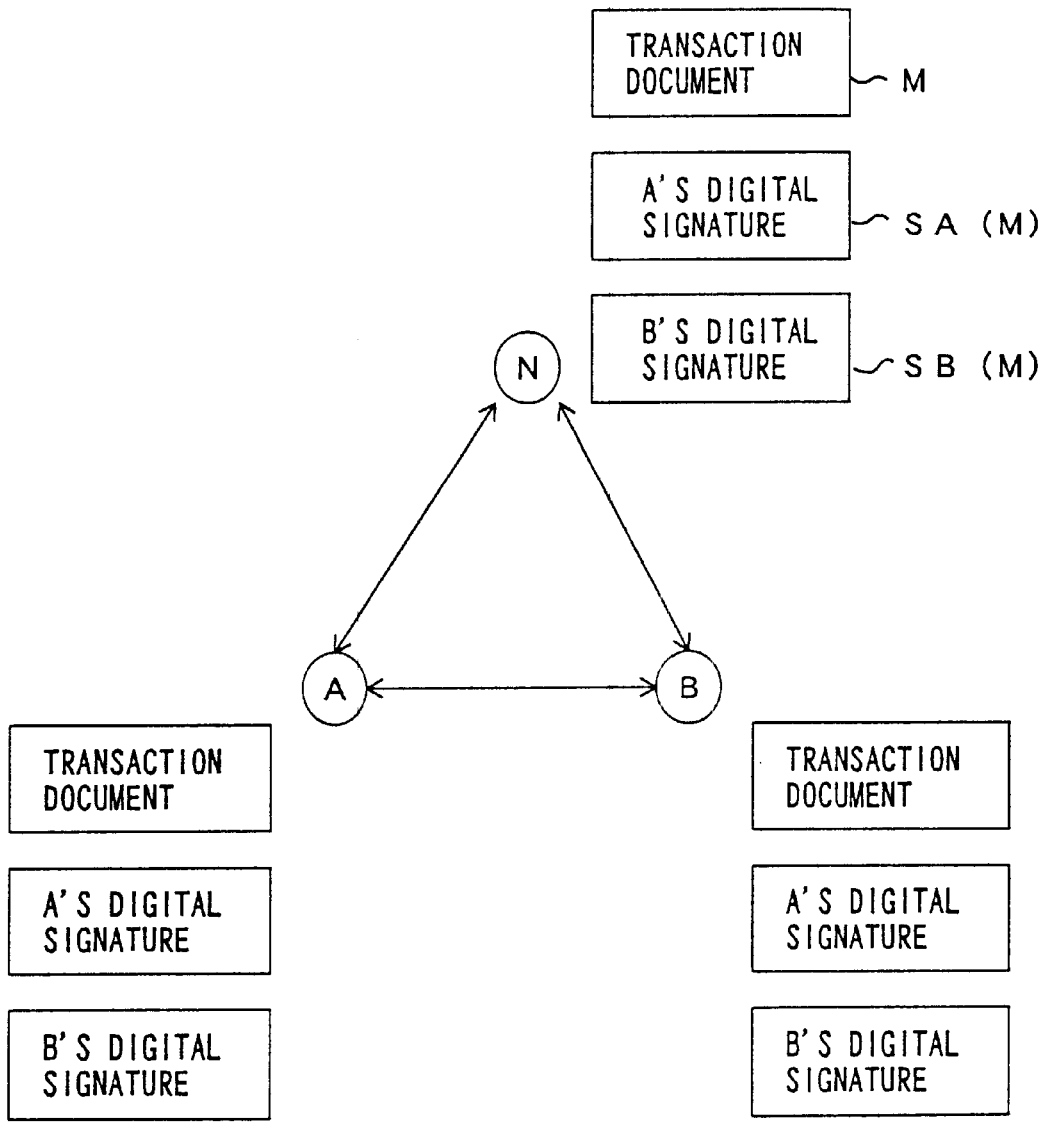
FIG. 5 is a diagram showing shared information in content guarantee services.

For the purpose of satisfying the above requisites, the sender, receiver and notary public N need to share the transaction information which bears the sender's and receiver's digital signatures. In the illustration of FIG. 5, a transaction document M in which the transactional contents are stated, and the digital signature SA(M) of the user A and the digital signature SB(M) of the user B for the transaction document M are shared by the users A and B and the notary public N.

Figure 6:
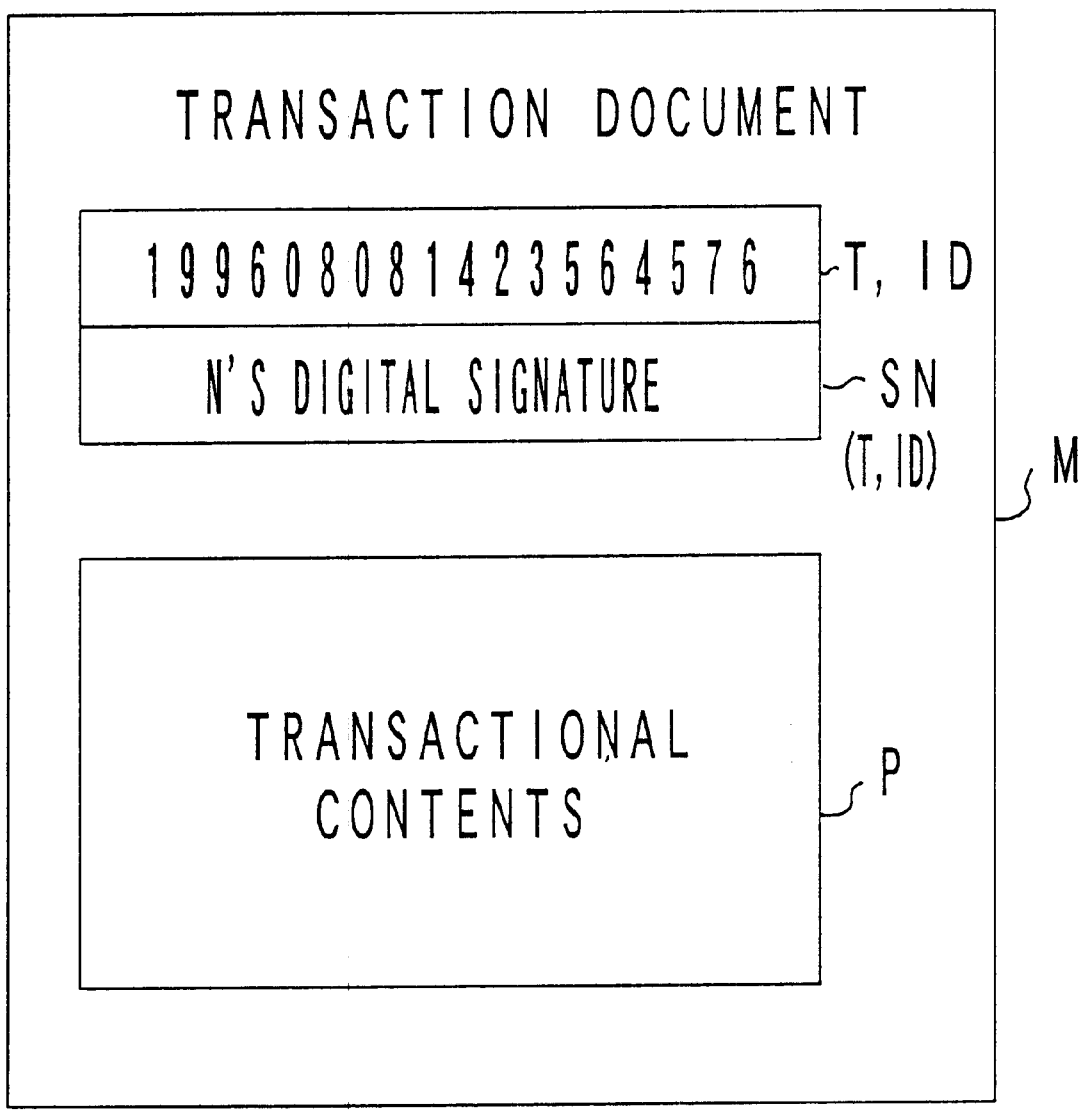
FIG. 6 is a diagram showing an example of a transaction missive.

FIG. 6 shows an example of the transaction document M indicated in FIG. 5. The transaction document M in FIG. 6 contains date-and-time information T and a transaction ID issued by the notary public N, in addition to a plaintext P which states the transactional contents such as the interested parties of trade, the subject of the trade, the sale price thereof, and the date and time thereof. Here, "19960808142356" corresponds to the date-and-time information T, and it expresses "1996 (year), 8 (month), 8 (day), 14; (hours), 23 (minutes), 56 (seconds)". Besides, "4567" expresses that the transaction ID is "0x4567 (hexadecimal number)".

Symbol SN(T, ID) denotes the digital signature of the notary public N for data obtained by concatenating the date-and-time information T and the transaction ID. This digital signature SN(T, ID) may well be replaced with the digital signature SN(T) of the notary public N for only the date-and-time information T and the digital signature SN(ID) of the notary public N for only the transaction ID.

Four basic models as shown in FIGS. 7, 8, 9 and 10 are considered as the aspects of performance of such a content guarantee service.

In these models, the transaction document M as shown in FIG. 6 is employed. Each of information aggregates which are interchanged among the users A and B and the notary public N, bears the digital signature of the sender. The receiver can identify the sender by verifying the borne digital signature. Accordingly, these models cover the identity guarantee service, the date-and-time guarantee service and the uniqueness guarantee service.

Figure 7:
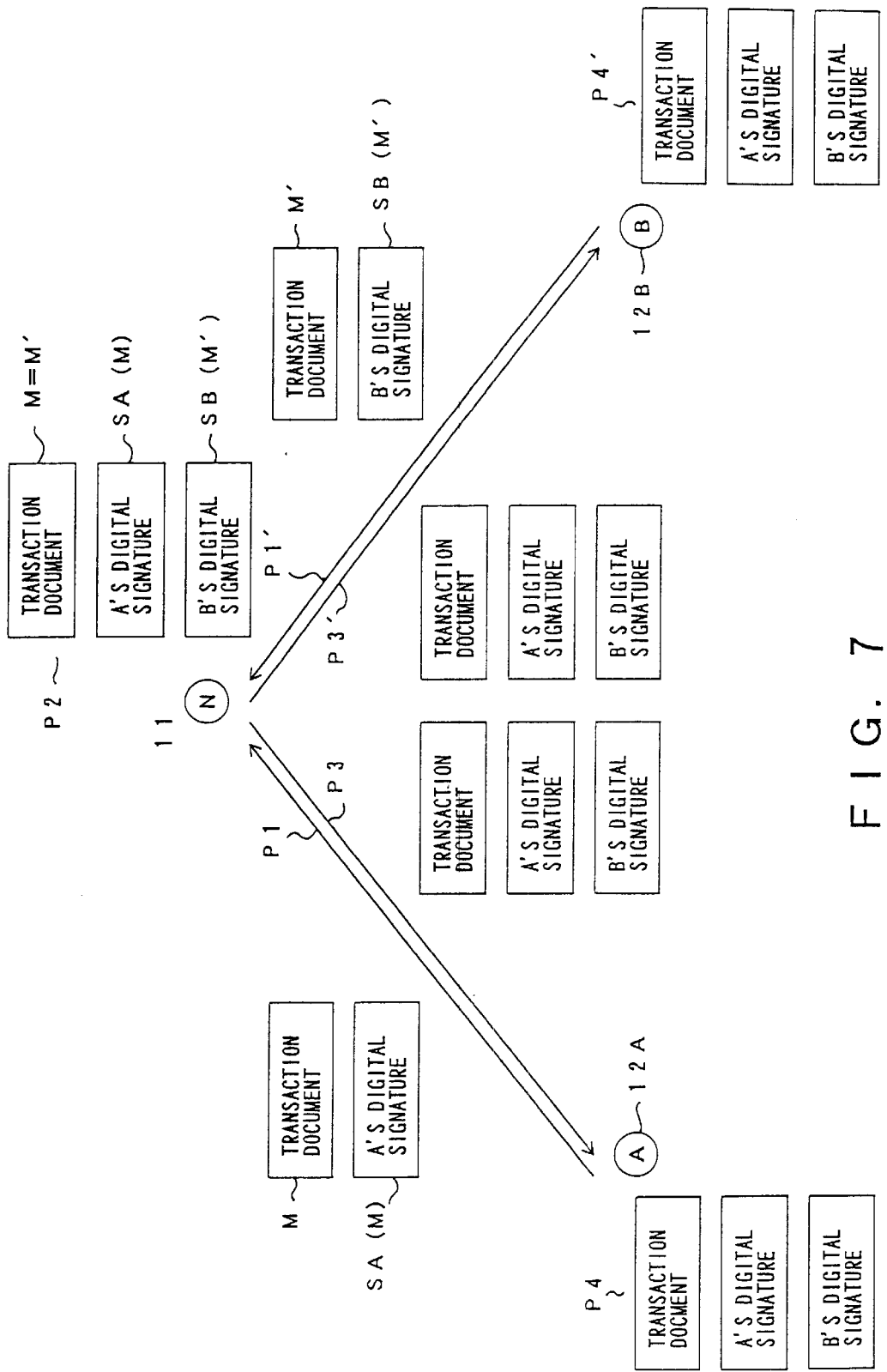
FIG. 7 is a diagram showing the first content guarantee service.

FIG. 7 illustrates the first model of the content guarantee service. In the first model, after the users A and B have interchanged the transactional contents P in online or offline fashion, each of them sends the transaction information to the notarization device 11. The flow of processing in FIG. 7 becomes as stated below.

P0: The terminal 12A of the user A acquires the date-and-time information T and the transaction ID from the notarization device 11.

P0': The terminal 12B of the user B acquires the date-and-time information T and the transaction ID from the notarization device 11.

At the processing steps P0 and P0', the notarization device 11 issues the same date-and-time information T and transaction ID to the users A and B who are the interested parties of the transaction.

P1: The terminal 12A concatenates the date-and-time information T, transaction ID and transactional contents P, thereby to create the transaction document M. Subsequently, it fetches the secret key SA of the user A and creates the digital signature SA(M) for the transaction document M by use of the fetched key. Further, it transmits data {M, SA(M)} to the notarization device 11.

Any desired method can be utilized for the creation of the digital signature SA(M). An example of the method is such that the. transaction document M is compressed in conformity with a predetermined compression algorithm or hashed in conformity with a predetermined hashing algorithm, thereby to reduce the amount of data, and that the obtained data are encrypted by use of the secret key SA. Of course, the transaction document M may well be directly encrypted by use of the secret key SA.

P1': The terminal 12B concatenates the date-and-time information T, transaction ID and transactional contents P, thereby to create the transaction document M'. Subsequently, it fetches the secret key SB of the user B and creates the digital signature SB(M') for the transaction document M' by use of the fetched key. Further, it transmits data {M', SB(M')} to the notarization device 11.

P2: The notarization device 11 receives the data {M, SA(M)} and the data {M', SB(M')}. Further, it fetches the public keys PA and PB of the respective users A and B so as to verify the digital signature SA(M) with the public key PA and the digital signature SB(M') with the public key PB.

In the case where the amounts of data of the transaction documents M and M' in the respective digital signatures SA(M) and SB(M') have been reduced by the compression processing or the hash processing, the notarization device 11 subjects the received transaction documents M and M' to similar data reduction processing. Subsequently, the notarization device 11 compares the data thus obtained and respective data obtained by decrypting the digital signatures SA(M) and SB(M') with the public keys PA and PB, so as to verify the proprieties of the digital signatures SA(M) and SB(M').

On the other hand, in the case where the compression processing or the hash processing has not been executed, the notarization device 11 may merely compare the received transaction documents M and M' directly with the respective decrypted data of the digital signatures SA(M) and SB(M'). Here, if the digital signature SA(M) or SB(M') is not proper, the notarization device 11 notifies an error to the terminals 12A and 12B and then ends the processing.

On condition that the digital signatures SA(M) and SB(M') are proper, the notarization device 11 subsequently checks if the transaction documents M and M' are the same. Concretely, the notarization device 11 compares the date-and-time information items T, transaction IDs and transactional contents P stated in the transaction documents M and M', respectively, thereby to check the agreement between both the transaction documents M and M'. Also, the notarization device 11 checks if the date-and-time information T and transaction ID contained in the transaction document M agree with those issued by the device 11 itself, respectively.

In a case where the transaction documents M and M' do not agree, or where the date-and-time information T or the transaction ID is not proper, the notarization device 11 notifies an error to the terminals 12A and 12B and then ends the processing.

Subsequently, the notarization device 11 concatenates the transaction document M and the digital signatures SA(M) and SB(M'), thereby to create data {M, SA(M), SB(M')}, and it retains the created data.

P3: The notarization device 11 transmits the data {M, SA(M), SB(M')} to the terminal 12A.

P3': The notarization device 11 transmits the data {M, SA(M), SB(M')} to the terminal 12B.

P4: The terminal 12A receives the data {M, SA(M), SB(M')}. Besides, the terminal 12A fetches the public keys PA and PB of the respective users A and B so as to verify the digital signature SA(M) with the public key PA and the digital signature SB(M') with the public key PB. Here, if the digital signature SA(M) or SB(M') is not proper, the terminal 12A notifies an error to the notarization device 11 and the terminal 12B and then ends the processing.

Subsequently, the terminal 12A checks if the transaction document M received from the notarization device 11 is the same as the transaction document M created by the terminal 12A itself. If the received transaction document M is not proper, the terminal 12A notifies an error to the notarization device 11 and the terminal 12B and then ends the processing. On the other hand, if the received transaction document M is proper, the terminal 12A retains the data {M, SA(M), SB(M')} and then ends the processing.

P4': The terminal 12B receives the data {M, SA(M), SB(M')}. Besides, the terminal 12B fetches the public keys PA and PB of the respective users A and B so as to verify the digital signature SA(M) with the public key PA and the digital signature SB(M') with the public key PB. Here, if the digital signature SA(M) or SB(M') is not proper, the terminal 12B issues an error to the notarization device 11 and the terminal 12A and then ends the processing.

Subsequently, the terminal 12B checks if the transaction document M' received from the notarization device 11 is the same as the transaction document M' created by the terminal 12B itself. If the received transaction document M' is not proper, the terminal 12B issues an error to the notarization device 11 and the terminal 12A and then ends the processing.

On the other hand, if the received transaction document M' is proper, the terminal 12B retains the data {M, SA(M), SB(M')} and then ends the processing.

In the first model thus far explained, both the users A and B send the transaction information to the notary public N independently of each other. It is therefore possible to say that the users A and B are on equal statuses. Moreover, the users A and B can enjoy the service merely by affixing the digital signatures of their own. On the other hand, the notarization device 11 must make the verification of the sameness of the transaction documents M and M' in addition to the verifications of the digital signatures of the users A and B.

With this model, however, in the case where the notarization device 11 has failed to verify the sameness of the transaction documents M and M', it cannot specify which of the users A and B has altered the contents of the transaction document M or M'. Besides, the notarization device 11 might fail to verify the transaction information items of both the users A and B, for the reason that these transaction information items have not been sent to the notarization device 11 at the proper times.

Figure 8:
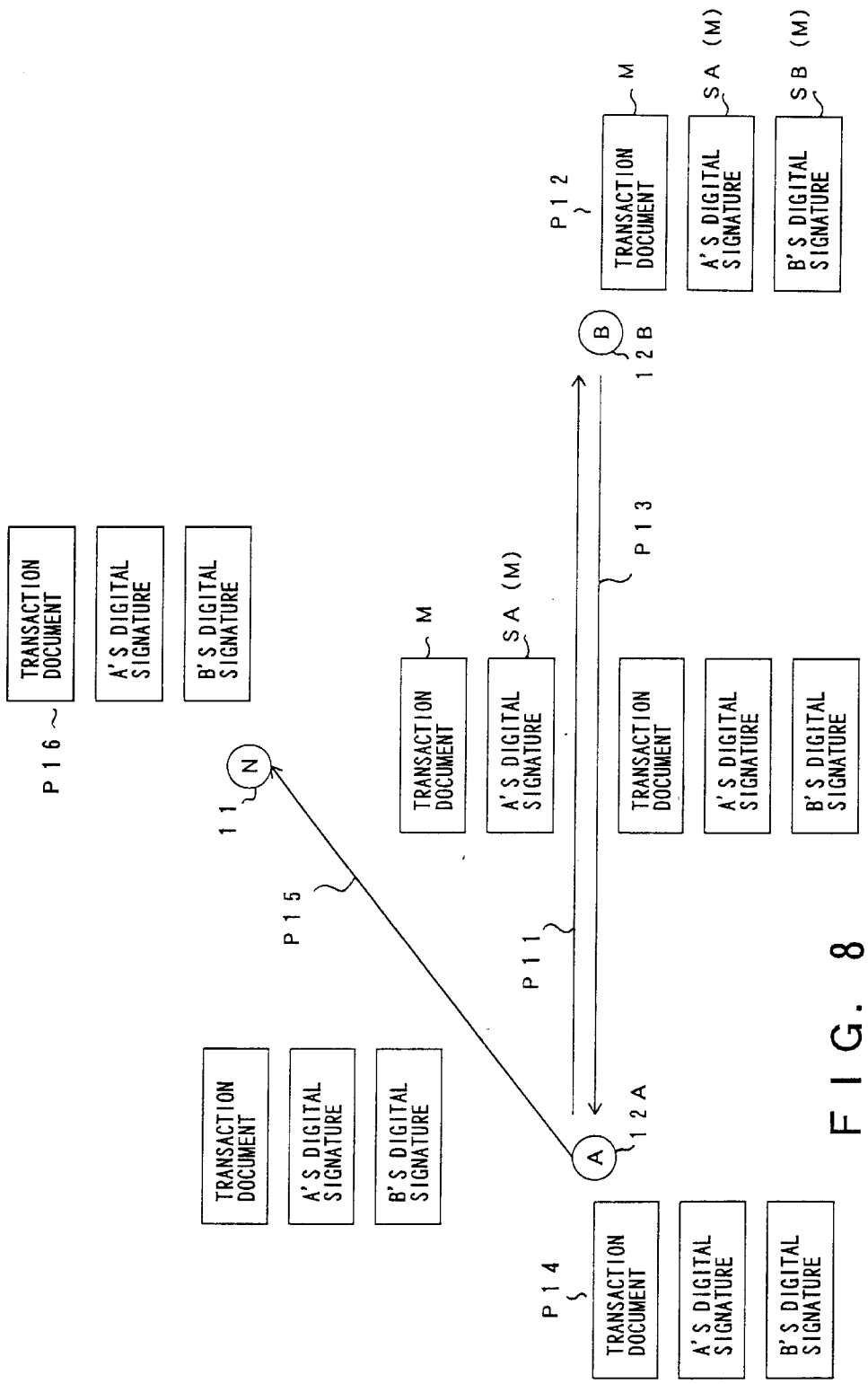
FIG. 8 is a diagram showing the second content guarantee service.

FIG. 8 illustrates the second model of the content guarantee service. In the second model, after the users A and B have interchanged the transactional contents P in online or offline fashion, only the user A sends the transaction information to the notarization device 11. The flow of processing in FIG. 8 becomes as stated below.

P10: The terminal 12A of the user A acquires the date-and-time information T and the transaction ID from the notarization device 11.

P11: The terminal 12A concatenates the date-and-time information T, transaction ID and transactional contents P, thereby to create the transaction document M. Subsequently, it fetches the secret key SA of the user A and creates the digital signature SA(M) for the transaction document M by use of the fetched key. Further, it transmits data {M, SA(M)} to the terminal 12B.

P12: The terminal 12B of the user B receives the data {M, SA(M)}. Besides, the terminal 12B fetches the public key PA of the user A so as to verify the digital signature SA(M) of the user A by use of the fetched key. Here, if the digital signature SA(M) is not proper, the terminal 12B notifies an error to the notarization device 11 and the terminal 12A and then ends the processing.

Subsequently, the terminal 12B fetches the secret key SB of the user B and creates the digital signature SB(M) thereof for the transaction document M by use of the fetched key. Besides, it creates data {M, SA(M), SB(M)} and retains the created data.

P13: The terminal 12B transmits the data {M, SA(M), SB(M)} to the terminal 12A.

P14: The terminal 12A receives the data {M, SA(M), SB(M)}. Besides, the terminal 12A fetches the public key PB of the user B so as to verify the digital signature SB(M) of the user B by use of the fetched key. Here, if the digital signature SB(M) is not proper, the terminal 12A notifies an error to the notarization device 11 and the terminal 12B and then ends the processing. In contrast, if the digital signature SB(M) is proper, the terminal 12A retains the data {M, SA(M), SB(M)}.

P15: The terminal 12A transmits the data {M, SA(M), SB(M)} to the notarization device 11.

P16: The notarization device 11 receives the data {M, SA(M), SB(M)}. Further, it fetches the public keys PA and PB of the respective users A and B so as to verify the digital signature SA(M) with the public key PA and the digital signature SB(M) with the public key PB. Here, if the digital signature SA(M) or SB(M) is not proper, the notarization device 11 notifies an error to the terminals 12A and 12B and then ends the processing.

On condition that the digital signatures SA(M) and SB(M) are proper, the notarization device 11 subsequently checks if the date-and-time information T and transaction ID contained in the transaction document M agree with those issued by the device 11 itself, respectively. In a case where the date-and-time information T or the transaction ID is not proper, the notarization device 11 notifies an error to the terminals 12A and 12B and then ends the processing.

If the digital signatures SA(M) and SB(M), date-and-time information T and transaction ID are all proper, the notarization device 11 retains the data {M, SA(M), SB(M)} and then ends the processing.

In the second model thus far explained, only the user A sends the transaction information to the notary public N, and hence, eventually the user A can determine if the content guarantee service is to be enjoyed. It is accordingly possible to say that the user A is on a more advantageous status.

Besides, the user B cannot enjoy the service unless the information bearing the digital signature of the user A is contained in the transaction document M. On the other hand, the user A cannot enjoy the service without the digital signature of the user B, but he/she can send the notary public N that information bearing the digital signature of the user B which was created in the past.

Figure 9:
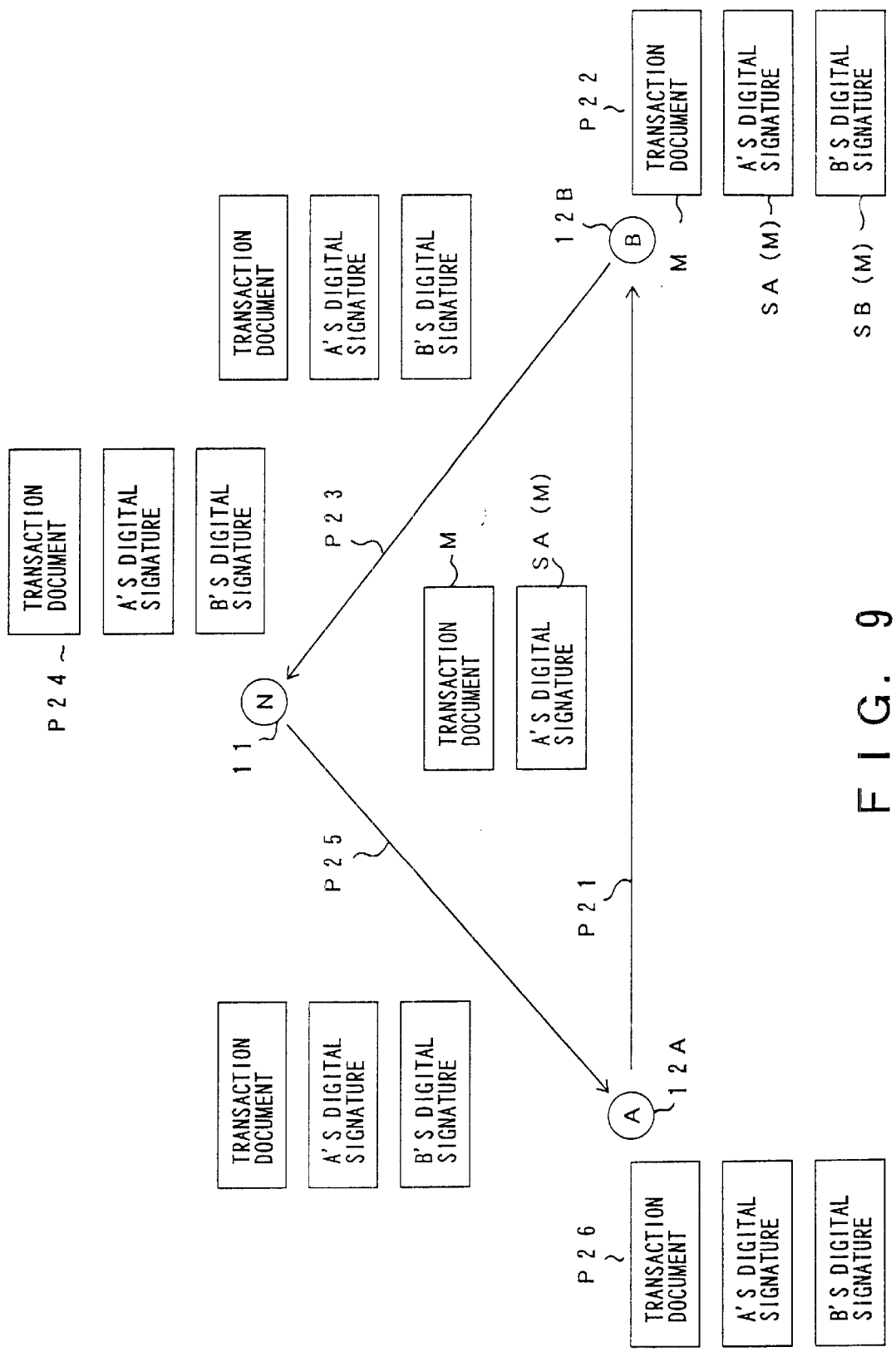
FIG. 9 is a diagram showing the third content guarantee service.

FIG. 9 illustrates the third model of the content guarantee service. In the third model, after the users A and B have interchanged the transactional contents P in online or offline fashion, only the user B sends the transaction information to the notarization device 11. The flow of processing in FIG. 9 becomes as stated below.

P20: The terminal 12A of the user A acquires the date-and-time information T and the transaction ID from the notarization device 11.

P21: The terminal 12A concatenates the date-and-time information T, transaction ID and transactional contents P, thereby to create the transaction document M. Subsequently, it fetches the secret key SA of the user A and creates the digital signature SA(M) for the transaction document M by use of the fetched key. Further, it transmits data {M, SA(M)} to the terminal 12B of the user B.

P22: The terminal 12B receives the data {M, SA(M)}. Besides, the terminal 12B fetches the public key PA of the user A so as to verify the digital signature SA(M) of the user A by use of the fetched key. Here, if the digital signature SA(M) is not proper, the terminal 12B notifies an error to the notarization device 11 and the terminal 12A and then ends the processing.

Subsequently, the terminal 12B fetches the secret key SB of the user B and creates the digital signature SB(M) thereof for the transaction document M by use of the fetched key. Besides, it creates data {M, SA(M), SB(M)} and retains the created data.

P23: The terminal 12B transmits the data {M, SA(M), SB(M)} to the notarization device 11.

P24: The notarization device 11 receives the data {M, SA(M), SB(M)}. Further, it fetches the public keys PA and PB of the respective users A and B so as to verify the digital signature SA(M) with the public key PA and the digital signature SB(M) with the public key PB. Here, if the digital signature SA(M) or SB(M) is not proper, the notarization device 11 notifies an error to the terminals 12A and 12B and then ends the processing.

On condition that the digital signatures SA(M) and SB(M) are proper, the notarization device 11 subsequently checks if the date-and-time information T and transaction ID contained in the transaction document M agree with those issued by the device 11 itself, respectively. In a case where the date-and-time information T or the transaction ID is not proper, the notarization device 11 notifies an error to the terminals 12A and 12B and then ends the processing.

If the digital signatures SA(M) and SB(M), date-and-time information T and transaction ID are all proper, the notarization device 11 retains the data {M, SA(M), SB(M)}.

P25: The notarization device 11 transmits the data {M, SA(M), SB(M)} to the terminal 12A.

P26: The terminal 12A receives the data {M, SA(M), SB(M)}. Besides, the terminal 12A fetches the public keys PA and PB of the respective users A and B so as to verify the digital signature SA(M) with the public key PA and the digital signature SB(M) with the public key PB. Here, if the digital signature SA(M) or SB(M) is not proper, the terminal 12A notifies an error to the notarization device 11 and the terminal 12B and then ends the processing. On the other hand, if the digital signatures SA(M) and SB(M) are proper, the terminal 12A retains the data {M, SA(M), SB(M)} and then ends the processing.

In the third model thus far explained, only the user B sends the transaction information to the notary public N, and hence, eventually the user B can determine if the content guarantee service is to be enjoyed. It is accordingly possible to say that the user B is on a more advantageous status. The user B, however, cannot enjoy the service unless the information bearing the digital signature of the user A is contained in the transaction document M. On the other hand, the user A cannot know if the user B has approved the transaction with the user A himself/herself, unless he/she receives the transaction information from the notary public N.

Figure 10:
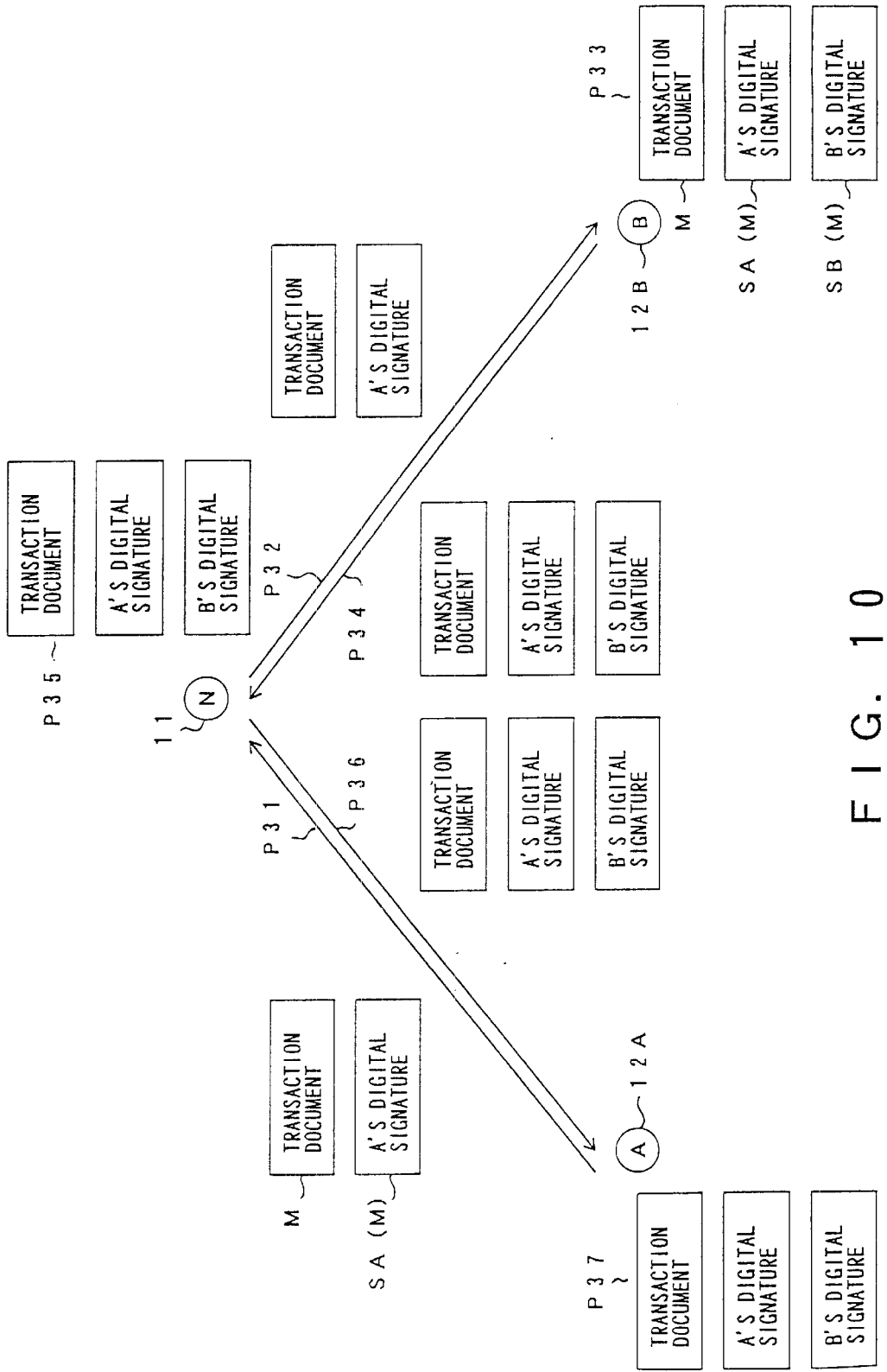
FIG. 10 is a diagram showing the fourth content guarantee service.

FIG. 10 illustrates the fourth model of the content guarantee service. In the fourth model, the notarization device 11 arranges the transaction between the users A and B. The flow of processing in FIG. 10 becomes as stated below.

P30: The terminal 12A of the user A acquires the date-and-time information T and the transaction ID from the notarization device 11.

P31: The terminal 12A concatenates the date-and-time information T, transaction ID and transactional contents P, thereby to create the transaction document M. Subsequently, it fetches the secret key SA of the user A and creates the digital signature SA(M) for the transaction document M by use of the fetched key. Further, it transmits data {M, SA(M)} to the notarization device 11.

P32: The notarization device 11 receives the data {M, SA(M)}. Further, it fetches the public key PA of the user A so as to verify the digital signature SA(M) with the public key PA. Here, if the digital signature SA(M) is not proper, the notarization device 11 notifies an error to the terminal 12A and then ends the processing. In contrast, if the digital signature SA(M) is proper, the notarization device 11 transmits the data {M, SA(M)} to the terminal 12B of the user B.

P33: The terminal 12B receives the data {M, SA(M)}. In a case where the user B cannot accede to the pertinent transaction in view of the transactional contents P contained in the received transaction document M, he/she reports that to the terminal 12A and ends the processing of the terminal 12B. On the other hand, in a case where the user B accedes to the pertinent transaction, he/she instructs the terminal 12B to continue the processing thereof.

Subsequently, the terminal 12B fetches the public key PA of the user A so as to verify the digital signature SA(M) with the public key PA. Here, if the digital signature SA(M) is not proper, the terminal 12B notifies an error to the notarization device 11 and the terminal 12A and then ends the processing.

Subsequently, the terminal 12B fetches the secret key SB of the user B and creates the digital signature SB(M) for the transaction document M by use of the fetched key. Besides, it creates data {M, SA(M), SB(M)} and retains the created data.

P34: The terminal 12B transmits the data {M, SA(M), SB(M)} to the notarization device 11.

P35: The notarization device 11 receives the data {M, SA(M), SB(M)}. Further, it fetches the public keys PA and PB of the respective users A and B so as to verify the digital signature SA(M) with the public key PA and the digital signature SB(M) with the public key PB. Here, if the digital signature SA(M) or SB(M) is not proper, the notarization device 11 notifies an error to the terminals 12A and 12B and then ends the processing.

On condition that the digital signatures SA(M) and SB(M) are proper, the notarization device 11 subsequently checks if the date-and-time information T and transaction ID contained in the transaction document M agree with those issued by the device 11 itself, respectively. In a case where the date-and-time information T or the transaction ID is not proper, the notarization device 11 notifies an error to the terminals 12A and 12B and then ends the processing.

If the digital signatures SA(M) and SB(M), date-and-time information T and transaction ID are all proper, the notarization device 11 retains the data {M, SA(M), SB(M)}.

P36: The notarization device 11 transmits the data {M, SA(M), SB(M)} to the terminal 12A.

P37: The terminal 12A receives the data {M, SA(M), SB(M)}. Besides, the terminal 12A fetches the public keys PA and PB of the respective users A and B so as to verify the digital signature SA(M) with the public key PA and the digital signature SB(M) with the public key PB. Here, if the digital signature SA(M) or SB(M) is not proper, the terminal 12A notifies an error to the notarization device 11 and the terminal 12B and then ends the processing. In contrast, if the digital signatures SA(M) and SB(M) are proper, the terminal 12A retains the data {M, SA(M), SB(M)} and then ends the processing.

In the fourth model thus far explained, the notary public N arranges the transaction between the users A and B. Therefore, in a case where the contents of the transaction have been altered, the notary public N can specify which of the users A and B has altered the transactional contents.

In the second and third ones of the four models described above, the transaction information is transferred between the users A and B, and hence, the public keys need to be used for verifying the digital signatures of the transmitting parties or persons. Accordingly, the second and third models are premised on a public-key system such as the RSA (Rivest-ShamirAdleman) encryption.

On the other hand, in the first and fourth models, the transaction information is transferred between the user A and the notary public N or between the user B and the notary public N, and it is not transferred between the users A and B. In this case, the identity guarantee service can be incarnated even with a secret-key system such as the DES (Data Encryption Standard) system. It is necessary, however, that the notary public N knows the secret keys of the users A and B.

Next, the aspects of the performance of the transaction guarantee service will be described with reference to FIGS. 11 through 19.

In guaranteeing the fact that users A and B have carried on a transaction, the following service requisites are considered:

<1> The digital signature of a notary public N is affixed to information which is a transaction document bearing the digital signature of the user B, in order that the user A may prove the fact of the transaction with the user B to a third party or person C.

<2> The digital signature of the notary public N is affixed to information which is the transaction document bearing the digital signature of the user A, in order that the user B may prove the fact of the transaction with the user A to the third party C.

<3> The notary public N and the user B hold the digital signature of the notary public N for the information which is the transaction document bearing the digital signature of the user A, in order that the user A may be unable to deny the fact of the transaction with the user B.

<4> The notary public N and the user A hold the digital signature of the notary public N for the information which is the transaction document bearing the digital signature of the user B, in order that the user B may be unable to deny the fact of the transaction with the user A.

Figure 11:
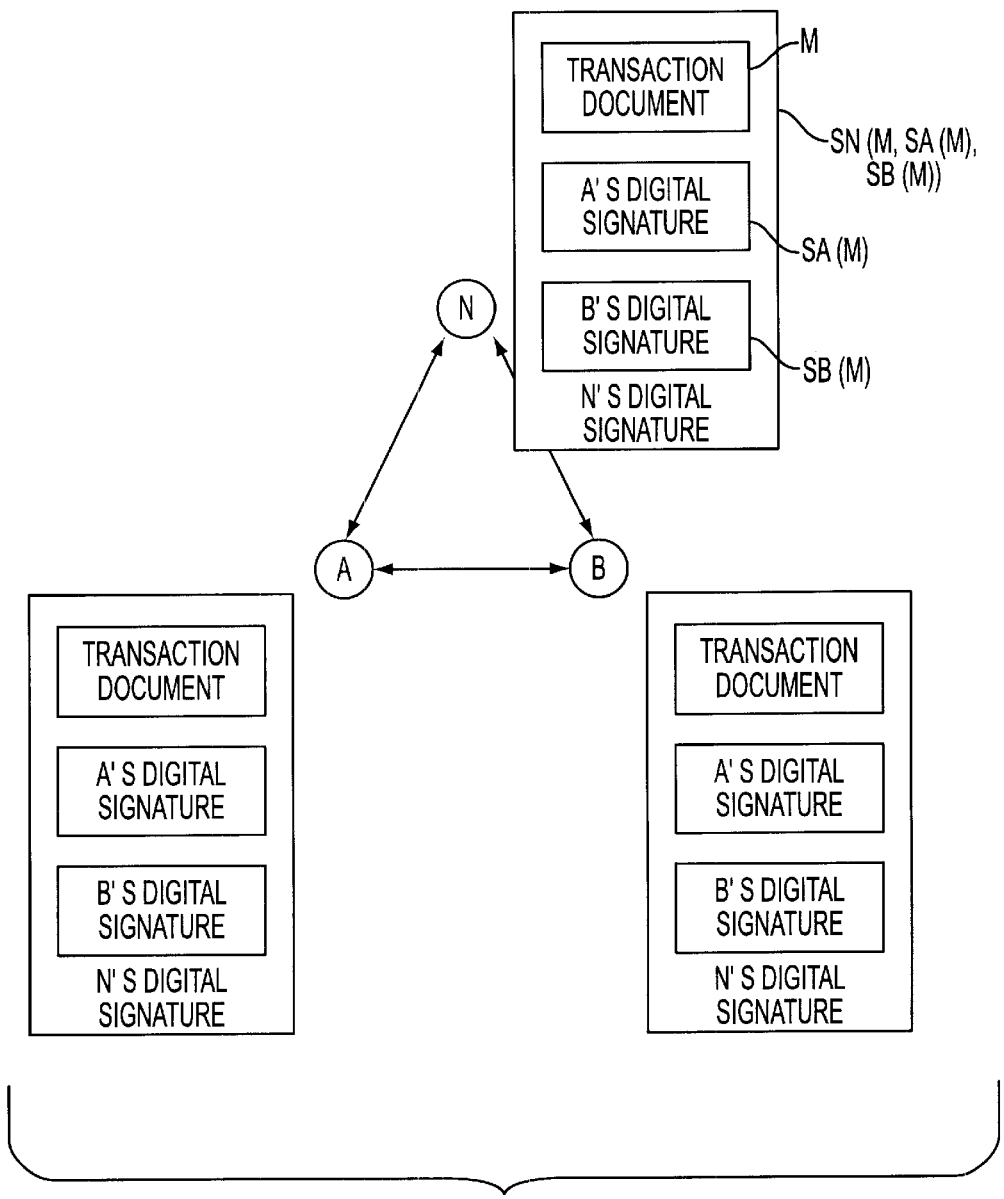
FIG. 11 is a diagram showing shared information in transaction guarantee services.

For the purpose of satisfying the above requisites, the users A and B and the notary public N may finally share the digital signature of the notary public N for information which is the transaction document bearing the digital signatures of the users A and B. In the illustration of FIG. 11, the digital signature SN(M, SA(M), SB(M)) of the notary public N for information in which the transaction document M, the digital signature SA(M) of the user A and the digital signature SB(M) of the user B are concatenated is shared by the users A and B and the notary public N.

Since the transaction guarantee service relates closely with the content guarantee service explained before, it is incarnated on the basis of the aspects of performance of the content guarantee service. The basic models of the transaction guarantee service become four models shown in FIGS. 12, 13, 14 and 15, in correspondence with the four basic models shown in FIGS. 7, 8, 9 and 10.

In these models, as in the case of the content guarantee service, the transaction document M as shown in FIG. 6 is employed, and information interchanged among the users A and B and the notary public N bears the digital signature of a sender. A receiver can identify the sender by verifying the borne digital signature. Accordingly, these models cover the identity guarantee service, the date-and-time guarantee service, the uniqueness guarantee service and the content guarantee service.

Figure 12:
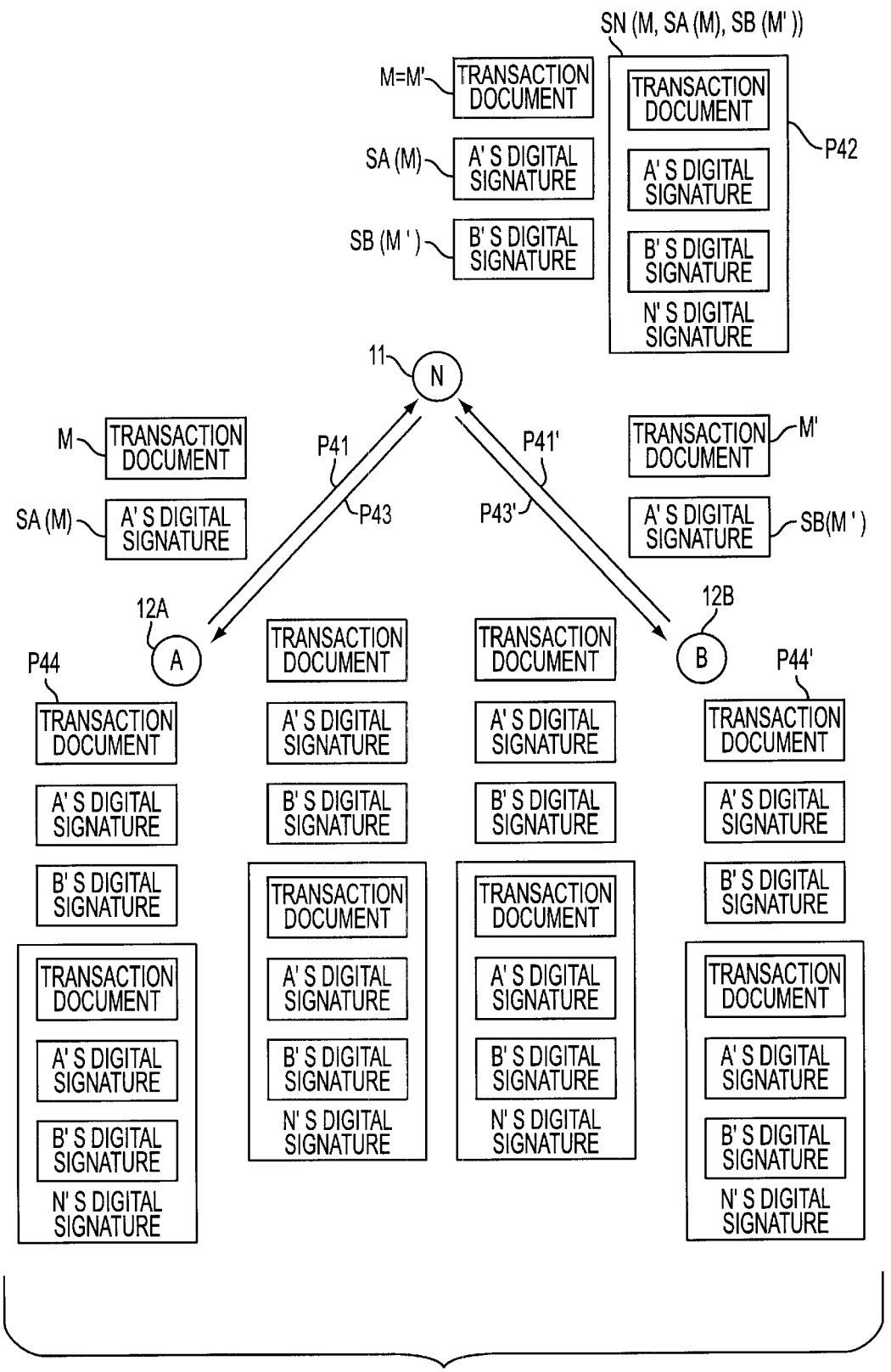
FIG. 12 is a diagram showing the first transaction guarantee service.

FIG. 12 illustrates the first model of the transaction guarantee service. In the first model, after the users A and B have interchanged the transactional contents P in online or offline fashion, each of them sends the transaction information to the notarization device 11. The flow of processing in FIG. 12 becomes as stated below.

P40: The terminal 12A of the user A acquires the date-and-time information T and the transaction ID from the notarization device 11.

P40': The terminal 12B of the user B acquires the date-and-time information T and the. transaction ID from the notarization device 11.

P41: The terminal 12A concatenates the date-and-time information T, transaction ID and transactional contents P, thereby to create the transaction document M. Subsequently, it fetches the secret key SA of the user A and creates the digital signature SA(K) for the transaction document M by use of the fetched key. Further, it transmits data {M, SA(M)} to the notarization device 11.

P41': The terminal 12B concatenates the date-and-time information T, transaction ID and transactional contents P, thereby to create the transaction document M'. Subsequently, it fetches the secret key SB of the user B and creates the digital signature SB(M') for the transaction document M' by use of the fetched key. Further, it transmits data {M', SB(M')} to the notarization device 11.

P42: The notarization device 11 receives the data {M, SA(M)} and the data {M', SB(M')}. Further, it fetches the public keys PA and PB of the respective users A and B so as to verify the digital signature SA(M) with the public key PA and the digital signature SB(M') with the public key PB. Here, if the digital signature SA(M) or SB(M') is not proper, the notarization device 11 notifies an error to the terminals 12A and 12B and then ends the processing.

On condition that the digital signatures SA(M) and SB(M') are proper, the notarization device 11 subsequently checks if the transaction documents M and M' are the same. Also, the notarization device 11 checks if the date-and-time information T and transaction ID contained in the transaction document M agree with those issued by the device 11 itself, respectively. In a case where the transaction documents M and M' do not agree, or where the date-and-time information T or the transaction ID is not proper, the notarization device 11 issues an error to the terminals 12A and 12B and then ends the processing.

Subsequently, the notarization device 11 concatenates the transaction document M and the digital signatures SA(M) and SB(M'), thereby to create data {M, SA(M), SB(M')}. Further, it fetches the secret key SN of the notary public N and creates digital signature SN(M, SA(M), SB(M')) for the data {M, SA(M), SB(M')} by use of the fetched key. Besides, it retains data {M, SA(M), SB(M'), SN(M, SA(M), SB(M'))}.

P43: The notarization device 11 transmits the data {M, SA(M), SB(M'), SN(M, SA(M), SB(M'))} to the terminal 12A.

P43': The notarization device 11 transmits the data {M, SA(M), SB(M'), SN(M, SA(M), SB(M'))} to the terminal 12B.

P44: The terminal 12A receives the data {M, SA(M), SB(M'), SN(M, SA(M), SB(M'))}. Then, the terminal 12A fetches the public key PN of the notary public N so as to verify the digital signature SN(M, SA(M), SB(M')) with the fetched key. Also, it fetches the public keys PA and PB of the respective users A and B so as to verify the digital signature SA(M) with the public key PA and the digital signature SB(M') with the public key PB. Here, if any of the digital signatures SN(M, SA(M), SB(M')), SA(M) and SB(M') is not proper, the terminal 12A notifies an error to the notarization device 11 and the terminal 12B and then ends the processing.

Subsequently, the terminal 12A checks if the transaction document M received from the notarization device 11 is the same as the transaction document M created by the terminal 12A itself. If the received transaction document M is not proper, the terminal 12A issues an error to the notarization device 11 and the terminal 12B and then ends the processing. On the other hand, if the received transaction document M is proper, the terminal 12A retains the data {M, SA(M), SB(M'), SN(M, SA(M), SB(M'))} and then ends the processing.

P44': The terminal 12B receives the data {M, SA(M), SB(M'), SN(M, SA(M), SB(M'))}. Besides, the terminal 12B fetches the public key PN of the notary public N so as to verify the digital signature SN(M, SA(M), SB(M')) with the fetched key. Also, it fetches the public keys PA and PB of the respective users A and B so as to verify the digital signature SA(M) with the public key PA and the digital signature SB(M') with the public key PB. Here, if any of the digital signatures SN(M, SA(M), SB(M')), SA(M) and SB(M') is not proper, the terminal 12B notifies an error to the notarization device 11 and the terminal 12A and then ends the processing.

Subsequently, the terminal 12B checks if the transaction document M' received from the notarization device 11 is the same as the transaction document M' created by the terminal 12B itself. If the received transaction document M' is not proper, the terminal 12B notifies an error to the notarization device 11 and the terminal 12A and then ends the processing. On the other hand, if the received transaction document M' is proper, the terminal 12B retains the data {M, SA(M), SB(M'), SN(M, SA(M), SB(M'))} and then ends the processing.

Figure 13:
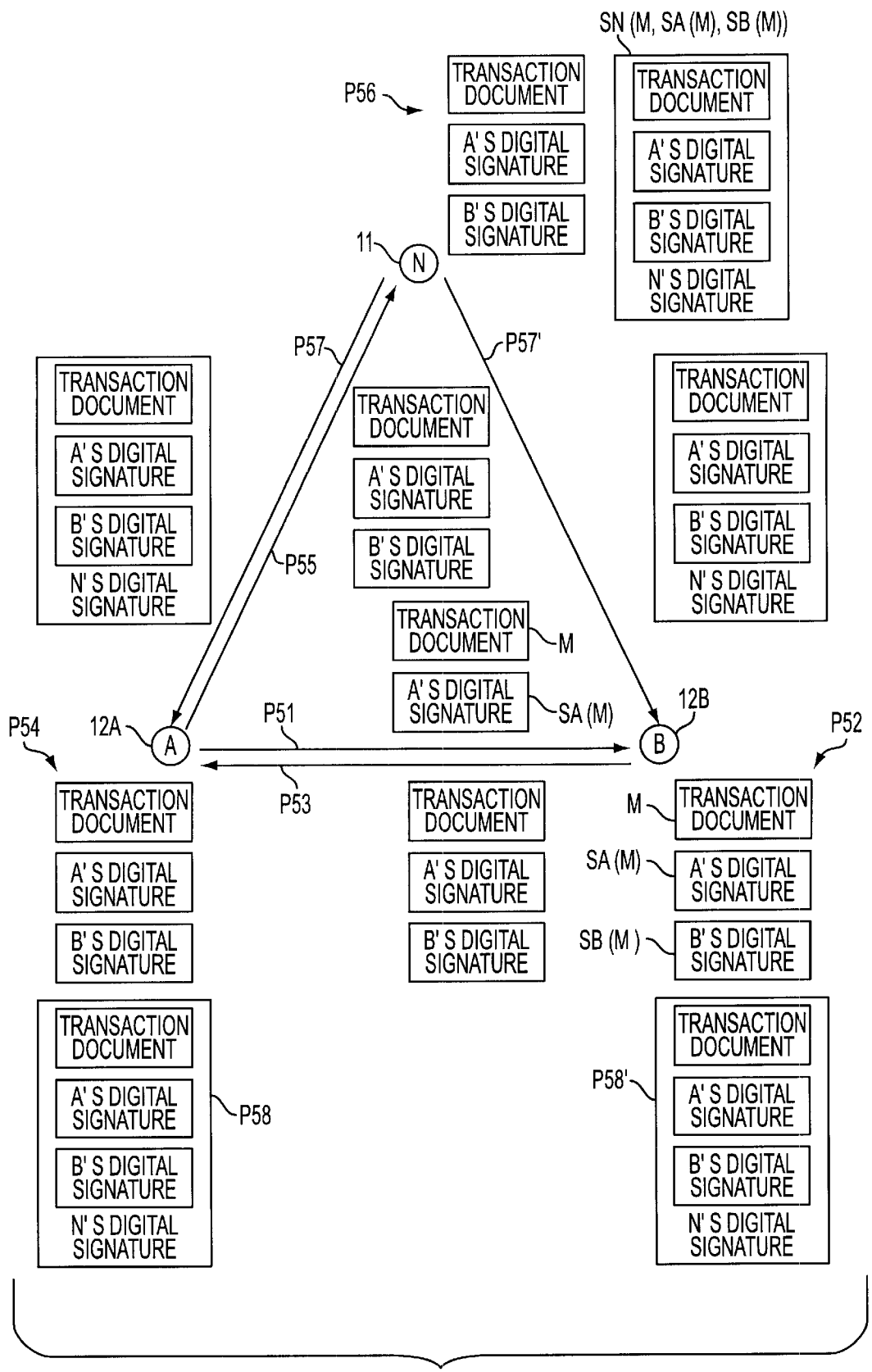
FIG. 13 is a diagram showing the second transaction guarantee service.

FIG. 13 illustrates the second model of the transaction guarantee service. In the second model, after the users A and B have interchanged the transactional contents P in online or offline fashion, only the user A sends the transaction information to the notarization device 11. The flow of processing in FIG. 13 becomes as stated below.

P50: The terminal 12A of the user A acquires the date-and-time information T and the transaction ID from the notarization device 11.

P51: The terminal 12A concatenates the date-and-time information T, transaction ID and transactional contents P, thereby to create the transaction document M. Subsequently, it fetches the secret key SA of the user A and creates the digital signature SA(M) for the transaction document M by use of the fetched key. Further, it transmits data {M, SA(M)} to the terminal 12B of the user B.

P52: The terminal 12B receives the data {M, SA(M)}. Besides, the terminal 12B fetches the public key PA of the user A so as to verify the digital signature SA(M) of the user A by use of the fetched key. Here, if the digital signature SA(M) is not proper, the terminal 12B issues an error to the notarization device 11 and the terminal 12A and then ends the processing.

Subsequently, the terminal 12B fetches the secret key SB of the user B and creates the digital signature SB(M) thereof for the transaction document M by use of the fetched key. Besides, it creates data {M, SA(M), SB(M)} and retains the created data.

P53: The terminal 12B transmits the data {M, SA(M), SB(M)} to the terminal 12A.

P54: The terminal 12A receives the data {M, SA(M), SB(M)}. Besides, the terminal 12A fetches the public key PB of the user B so as to verify the digital signature SB(M) of the user B by use of the fetched key. Here, if the digital signature SB(M) is not proper, the terminal 12A notifies an error to the notarization device 11 and the terminal 12B and then ends the processing. In contrast, if the digital signature SB(M) is proper, the terminal 12A retains the data {M, SA(M), SB(M)}.

P55: The terminal 12A transmits the data {M, SA(M), SB(M)} to the notarization device 11.

P56: The notarization device 11 receives the data {M,SA(M), SB(M)}. Further, it fetches the public keys PA and PB of the respective users A and B so as to verify the digital signature SA(M) with the public key PA and the digital signature SB(M) with the public key PB. Here, if the digital signature SA(M) or SB(M) is not proper, the notarization device 11 notifies an error to the terminals 12A and 12B and then ends the processing.

On condition that the digital signatures SA(M) and SB(M) are proper, the notarization device 11 subsequently checks if the date-and-time information T and transaction ID contained in the transaction document M agree with those issued by the device 11 itself, respectively. In a case where the date-and-time information T or the transaction ID is not proper, the notarization device 11 notifies an error to the terminals 12A and 12B and then ends the processing.

Subsequently, the notarization device 11 fetches the secret key SN of the notary public N and creates digital signature SN(M, SA(M), SB(M)) for the data {M, SA(M), SB(M)} by use of the fetched key. Besides, it creates data {M, SA(M), SB(M), SN(M, SA(M), SB(M))} and retains the created data.

P57: The notarization device 11 transmits the digital signature SN(M, SA(M), SB(M)) to the terminal 12A.

P57': The notarization device 11 transmits the digital signature SN(M, SA(M), SB(M)) to the terminal 12B.

P58: The terminal 12A receives the digital signature SN(M, SA(M), SB(M)). Besides, the terminal 12A fetches the public key PN of the notary public N so as to verify the digital signature SN(M, SA(M), SB(M)) by use of the fetched key. Here, if the digital signature SN(M, SA(M), SB(M)) is not proper, the terminal 12A notifies an error to the notarization device 11 and the terminal 12B and then ends the processing. In contrast, if the digital signature SN(M, SA(M), SB(M)) is proper, the terminal 12A retains this digital signature and then ends the processing.

P58': The terminal 12B receives the digital signature SN(M, SA(M), SB(M)). Besides, the terminal 12B fetches the public key PN of the notary public N so as to verify the digital signature SN(M, SA(M), SB(M)) by use of the fetched key. Here, if the digital signature SN(M, SA(M), SB(M)) is not proper, the terminal 12B notifies an error to the notarization device 11 and the terminal 12A and then ends the processing. In contrast, if the digital signature SN(M, SA(M), SB(M)) is proper, the terminal 12B retains this digital signature and then ends the processing.

Figure 14:
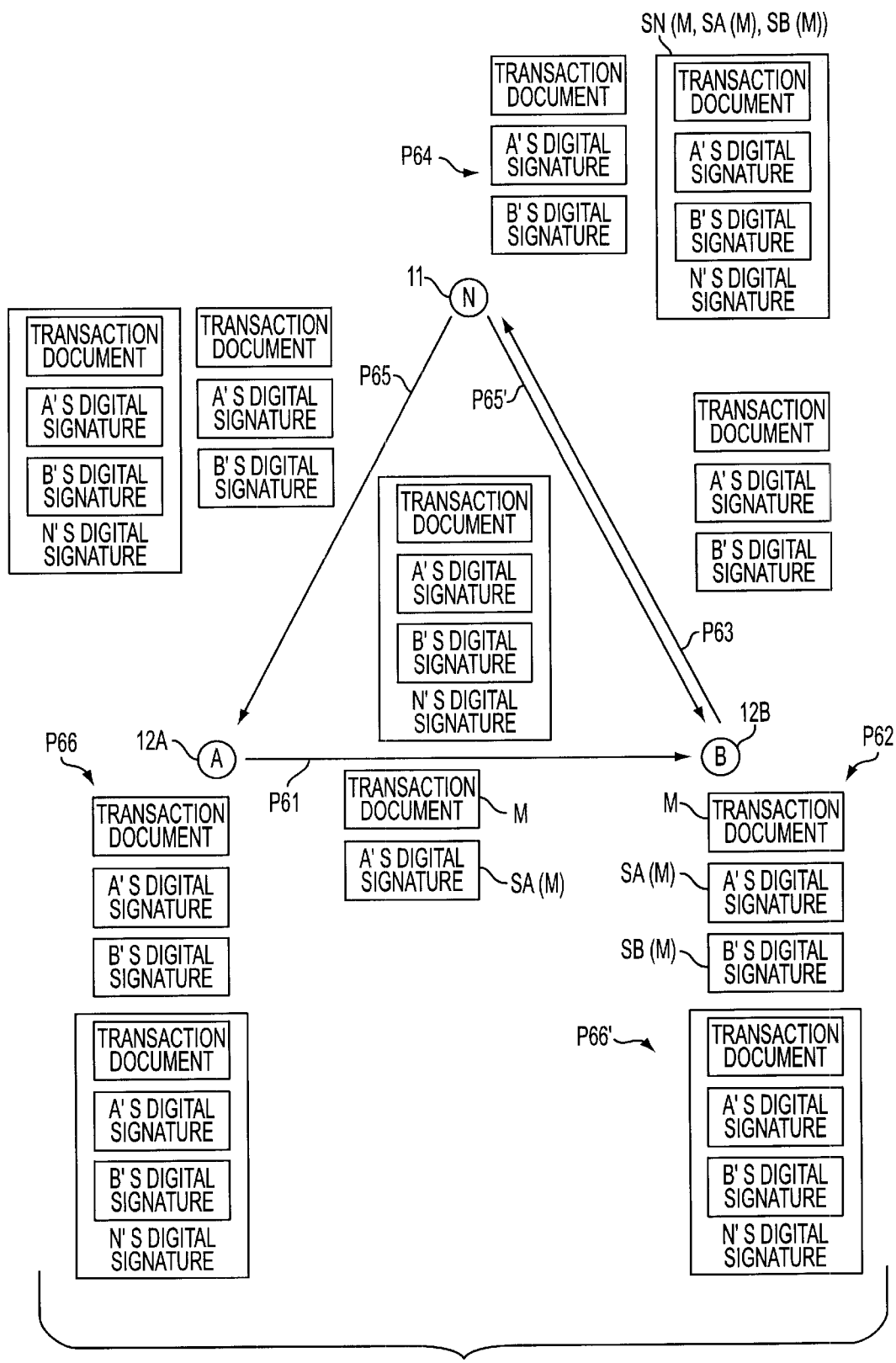
FIG. 14 is a diagram showing the third transaction guarantee service.

FIG. 14 illustrates the third model of the transaction guarantee service. In the third model, after the users A and B have interchanged the transactional contents P in online or offline-fashion, only the user B sends the-transaction information to the notarization device 11. The flow of processing in FIG. 14 becomes as stated below.

P60: The terminal 12A of the user A acquires the date-and-time information T and the transaction ID from the notarization device 11.

P61: The terminal 12A concatenates the date-and-time information T, transaction ID and transactional contents P, thereby to create the transaction document M. Subsequently, it fetches the secret key SA of the user A and creates the digital signature SA(M) for the transaction document M by use of the fetched key. Further, it transmits data {M, SA(M)} to the terminal 12B of the user B.

P62: The terminal 12B receives the data {M, SA(M)}. Besides, the terminal 12B fetches the public key PA of the user A so as to verify the digital signature SA(M) of the user A by use of the fetched key. Here, if the digital signature SA(M) is not proper, the terminal 12B notifies an error to the notarization device 11 and the terminal 12A and then ends the processing.

Subsequently, the terminal 12B fetches the secret key SB of the user B and creates the digital signature SB(M) thereof for the transaction document M by use of the fetched key. Then, it creates data {M, SA(M), SB(M)} and retains the created data. P63: The terminal 12B transmits the data {M, SA(M), SB(M)} to the notarization device 11.

P64: The notarization device 11 receives the data {M, SA(M), SB(M)}. Further, it fetches the public keys PA and PB of the respective users A and B so as to verify the digital signature SA(M) with the public key PA and the digital signature SB(M) with the public key PB. Here, if the digital signature SA(M) or SB(M) is not proper, the notarization device 11 notifies an error to the terminals 12A and 12B and then ends the processing.

On condition that the digital signatures SA(M) and SB(M) are proper, the notarization device 11 subsequently checks if the date-and-time information T and transaction ID contained in the transaction document M agree with those issued by the device 11 itself, respectively. In a case where the date-and-time information T or the transaction ID is not proper, the notarization device 11 issues an error to the terminals 12A and 12B and then ends the processing.

Subsequently, the notarization device 11 fetches the secret key SN of the notary public N and creates digital signature SN(M, SA(M), SB(M)) for the data {M, SA(M), SB(M)} by use of the fetched key. Besides, it creates data {M, SA(M), SB(M), SN(M, SA(M), SB(M))} and retains the created data.

P65: The notarization device 11 transmits the data {M, SA(M), SB(M), SN(M, SA(M), SB(M))} to the terminal 12A.

P65': The notarization device 11 transmits the digital signature SN(M, SA(M), SB(M)) to the terminal 12B.

P66: The terminal 12A receives the data {M, SA(M), SB(M), SN(M, SA(M), SB(M))}. Then, the terminal 12A fetches the public keys PA, PB and PN of the user A, the user B and the notary public N so as to verify the digital signature SA(M) with the public key PA, the digital signature SB(M) with the public key PB, and the digital signature SN(M, SA(M), SB(M)) with the public key PN, respectively.

Here, if any of the digital signatures SA(M), SB(M) and SN(M, SA(M), SB(M)) are not proper, the terminal 12A issues an error to the notarization device 11 and the terminal 12B and then ends the processing. In contrast, if all the digital signatures are proper, the terminal 12A retains the data {M, SA(M), SB(M), SN(M, SA(M), SB(M))} and then ends the processing.

P66': The terminal 12B receives the digital signature SN(M, SA(M), SB(M)). Besides, the terminal 12B fetches the public key PN of the notary public N so as to verify the digital signature SN(M, SA(M), SB(M)) by use of the fetched key. Here, if the digital signature SN(M, SA(M), SB(M)) is not proper, the terminal 12B issues an error to the notarization device 11 and the terminal 12A and then ends the processing. In contrast, if the digital signature SN(M, SA(M), SB(M)) is proper, the terminal 12B retains this digital signature and then ends the processing.

Figure 15:
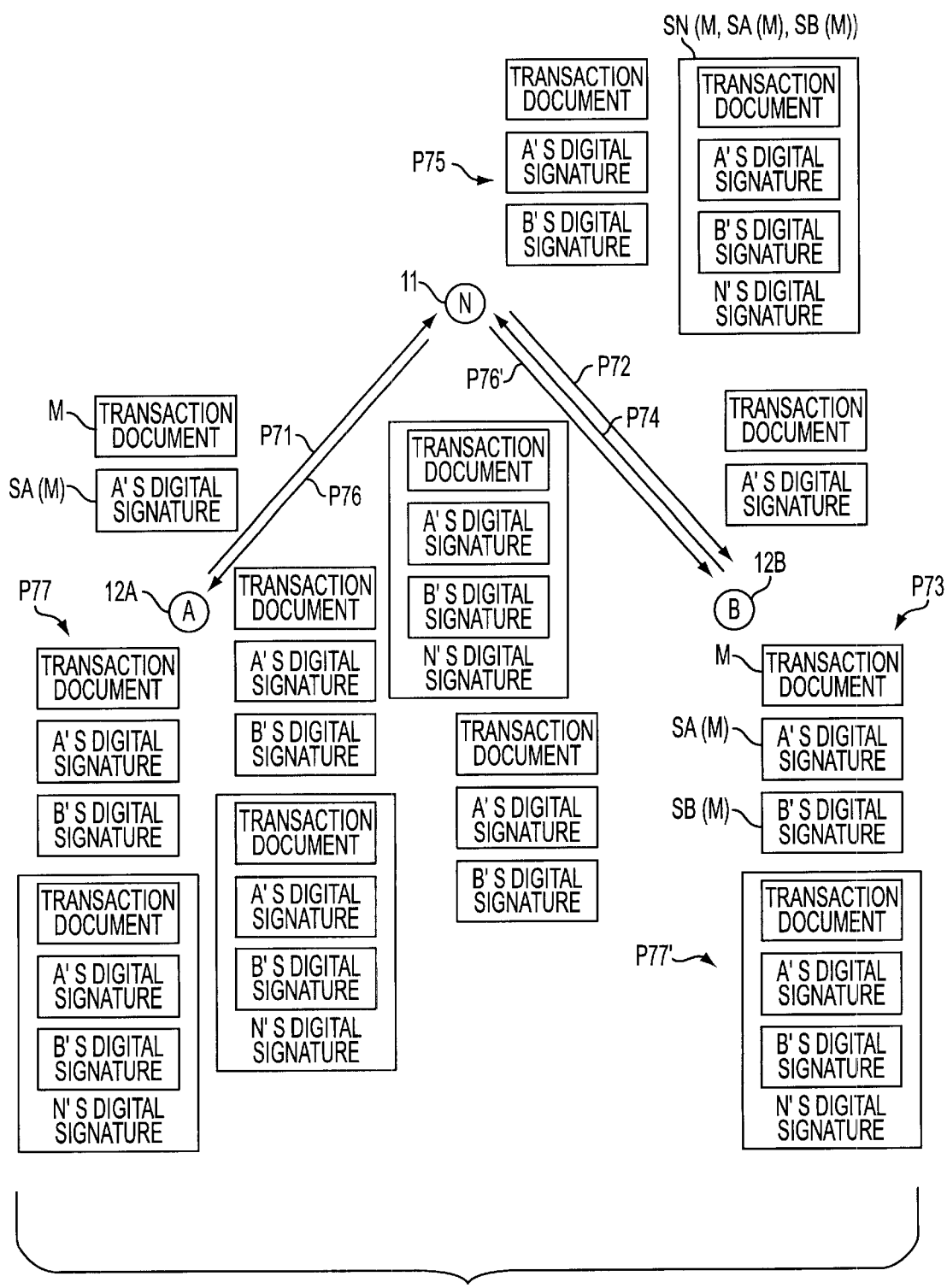
FIG. 15 is a diagram showing the fourth transaction guarantee service.

FIG. 15 illustrates the fourth model of the transaction guarantee service. In the fourth model, the notarization device 11 arranges the transaction between the users A and B. The flow of processing in FIG. 15 becomes as stated below.

P70: The terminal 12A of the user A acquires the date-and-time information T and the transaction ID from the notarization device 11.

P71: The terminal 12A concatenates the date-and-time information T, transaction ID and transactional contents P, thereby to create the transaction document M. Subsequently, it fetches the secret key SA of the user A and creates the digital signature SA(M) for the transaction document M by use of the fetched key. Further, it transmits data {M, SA(M)} to the notarization device 11.

P72: The notarization device 11 receives the data {M, SA(M)}. Further, it fetches the public key PA of the user A so as to verify the digital signature SA(M) with the public key PA. Here, if the digital signature SA(M) is not proper, the notarization device 11 notifies an error to the terminal 12A and then ends the processing. In contrast, if the digital signature SA(M) is proper, the notarization device 11 transmits the data {M, SA(M)} to the terminal 12B of the user B.

P73: The terminal 12B receives the data {M, SA(M)}. In a case where the user B cannot accede to the pertinent transaction in view of the transactional contents P contained in the received transaction document M, he/she reports to that effect to the terminal 12A and ends the processing of the terminal 12B. On the other hand, in a case where the user B accedes to the pertinent transaction, he/she instructs the terminal 12B to continue the processing thereof.

Subsequently, the terminal 12B fetches the public key PA of the user A so as to verify the digital signature SA(M) with the public key PA. Here, if the digital signature SA(M) is not proper, the terminal 12B issues an error to the notarization device 11 and the terminal 12A and then ends the processing.

Subsequently, the terminal 12B fetches the secret key SB of the user B and creates the digital signature SB(M) for the transaction document M by use of the fetched key. Besides, it creates data {M, SA(M), SB(M)} and retains the created data.

P74: The terminal 12B transmits the data {M, SA(M), SB(M)} to the notarization device 11.

P75: The notarization device 11 receives the data {M, SA(M), SB(M)}. Further, it fetches the public keys PA and PB of the respective users A and B so as to verify the digital signature SA(M) with the public key PA and the digital signature SB(M) with the public key PB. Here, if the digital signature SA(M) or SB(M) is not proper, the notarization device 11 notifies an error to the terminals 12A and 12B and then ends the processing.

On condition that the digital signatures SA(M) and SB(M) are proper, the notarization device 11 subsequently checks if the date-and-time information T and transaction ID contained in the transaction document M agree with those issued by the device 11 itself, respectively. In a case where the date-and-time information T or the transaction ID is not proper, the notarization device 11 notifies an error to the terminals 12A and 12B and then ends the processing.

Subsequently, the notarization device 11 fetches the secret key SN of the notary public N and creates digital signature SN(M, SA(M), SB(M)) for the data {M, SA(M), SB(M)} by use of the fetched key. Besides, it creates data {M, SA(M), SB(M), SN(M, SA(M), SB(M))} and retains the created data.

P76: The notarization device 11 transmits the data {M, SA(M), SB(M), SN(M, SA(M), SB(M))} to the terminal 12A.

P76': The notarization device 11 transmits the digital signature SN(M, SA(M), SB(M)) to the terminal 12B.

P77: The terminal 12A receives the data {M, SA(M), SB(M), SN(M, SA(M), SB(M))}. Besides, the terminal 12A fetches the public keys PA, PB and PN of the user A, the user B and the notary public N so as to verify the digital signature SA(M) with the public key PA, the digital signature SB(M) with the public key PB, and the digital signature SN(M, SA(M), SB(M)) with the public key PN, respectively.

Here, if any of the digital signatures SA(M), SB(M) and SN(M, SA(M), SB(M)) are not proper, the terminal 12A notifies an error to the notarization device 11 and the terminal 12B and then ends the processing. In contrast, if all the digital signatures are proper, the terminal 12A retains the data {M, SA(M), SB(M), SN(M, SA(M), SB(M))} and then ends the processing.

P77': The terminal 12B receives the digital signature SN(M, SA(M), SB(M)). Besides, the terminal 12B fetches the public key PN of the notary public N so as to verify the digital signature SN(M, SA(M), SB(M)) by use of the fetched key. Here, if the digital signature SN(M, SA(M), SB(M)) is not proper, the terminal 12B notifies an error to the notarization device 11 and the terminal 12A and then ends the processing. In contrast, if the digital signature SN(M, SA(M), SB(M)) is proper, the terminal 12B retains this digital signature and then ends the processing.

Next, the processing of the notarization device 11 and the terminals 12A, 12B in the first model of the transaction guarantee service as depicted in FIG. 12 will be described again with reference to flow charts shown in FIGS. 16 through 19.

Figure 16:
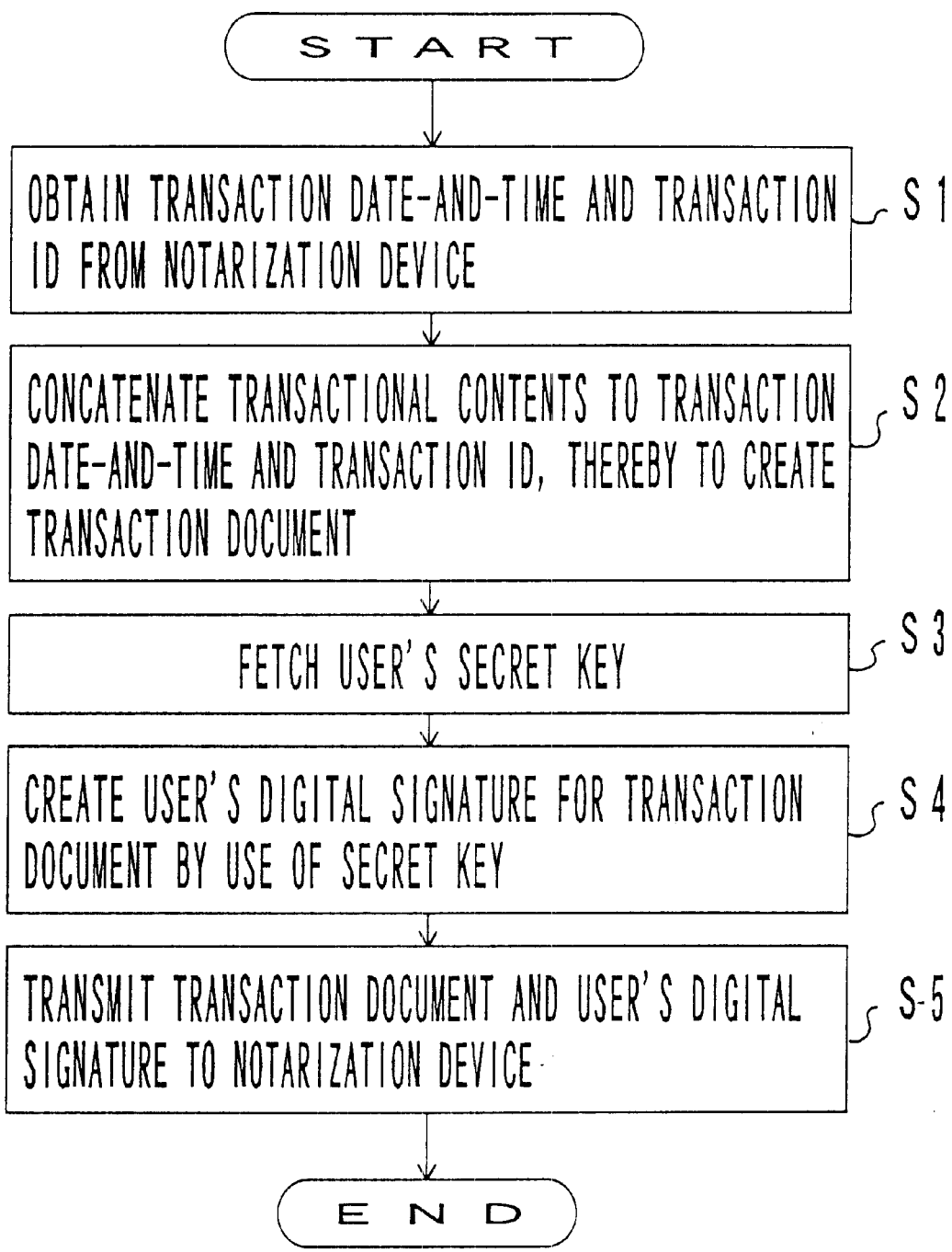
FIG. 16 is a flow chart showing the first processing of a user terminal.

FIG. 16 is the flow chart which corresponds to the processing P40 and P41 of the terminal 12A or the processing P40' and P41' of the terminal 12B. When the processing has been started in FIG. 16, the terminal 12A (or the terminal 12B) first obtains the date-and-time information T and the transaction ID from the notarization device 11 through the network 13 (step S1).

Subsequently, the terminal 12A (or the terminal 12B) concatenates the date-and-time information T, transaction ID and transactional contents P, thereby to create the transaction document M (or M') as shown in FIG. 6 (step S2). Besides, it fetches the secret key SA (or SB) of the correspondent user (step S3), and it creates the digital signature SA(M) (or SB(M')) of the particular user for the transaction document M (or M') by use of the fetched key (step S4).

Further, the terminal 12A (or the terminal 12B) transmits the transaction document M (or M') and the user's digital signature SA(M) (or SB(M')) to the notarization device 11 through the network 13 (step S5), whereupon it ends the processing.

Figure 17:
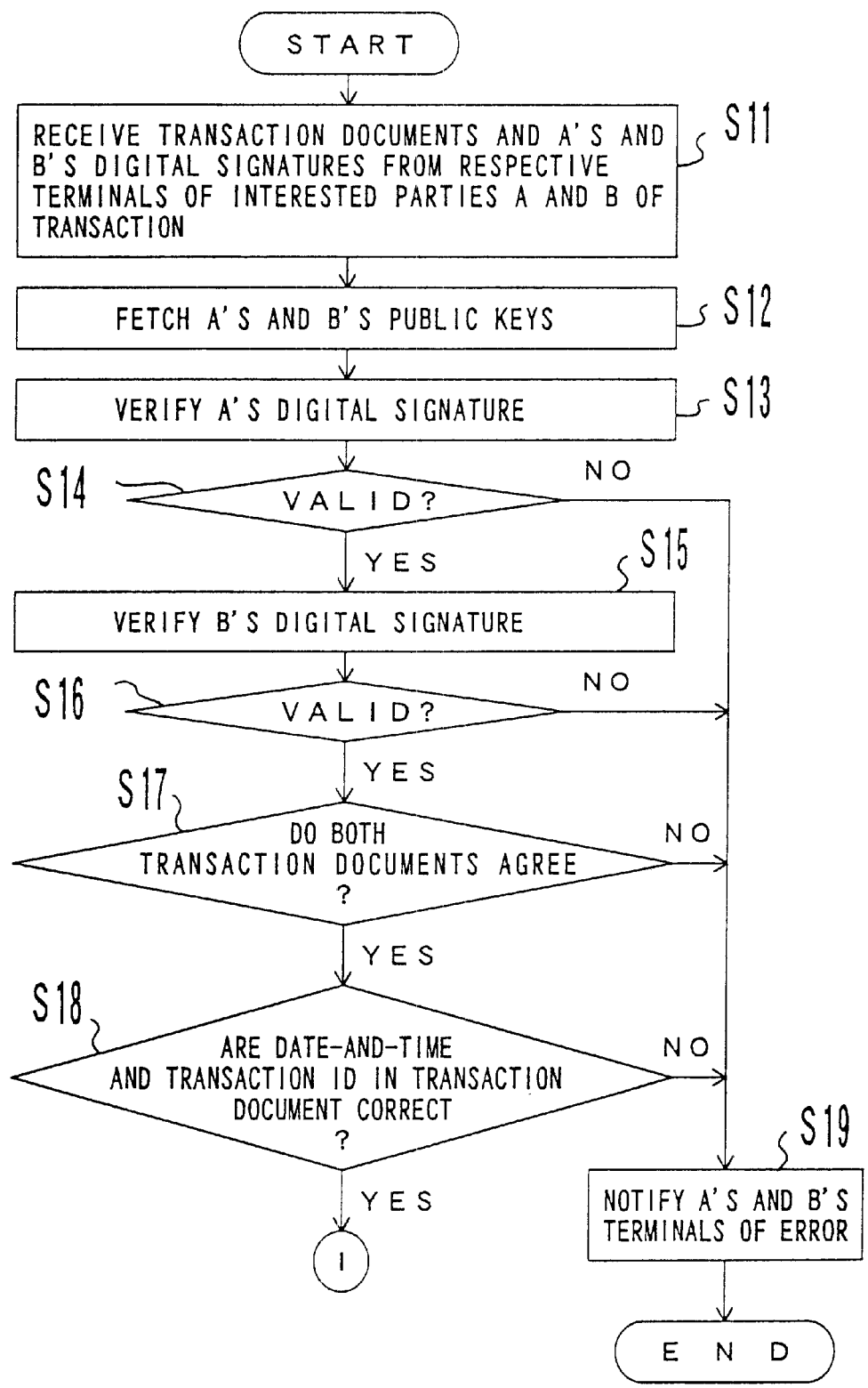
FIG. 17 is a flow chart (part #1) showing the processing of a notarization device.
Figure 18:
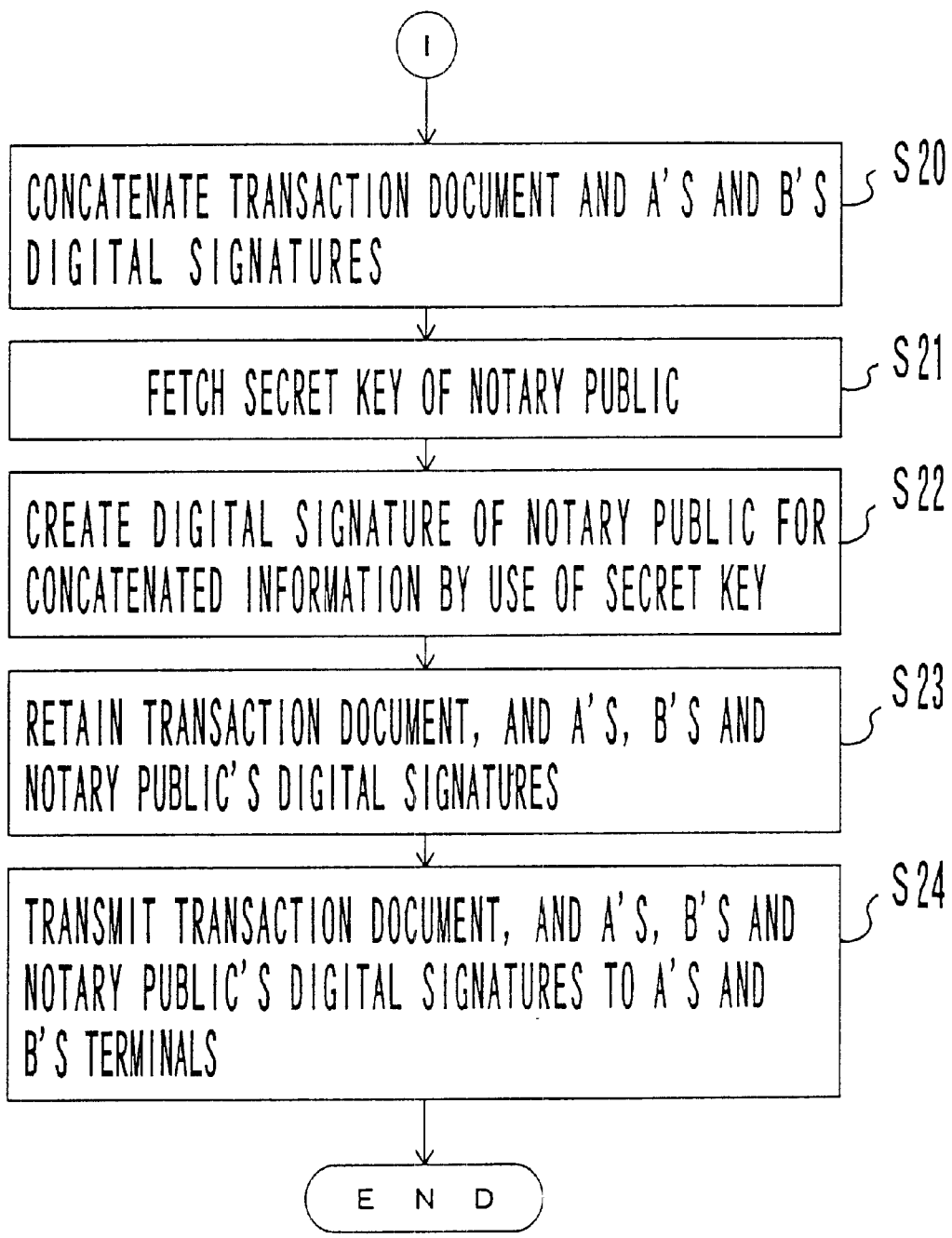
FIG. 18 is a flow chart (part #2) showing the processing of the notarization device.

FIGS. 17 and 18 are the flow charts which correspond to the processing P42, P43 and P43' of the notarization device 11. When the processing has been started in FIG. 17, the notarization device 11 first receives the transaction document M and the digital signature SA(M) from the terminal 12A of the user A through the network 13 and receives the transaction document M' and the digital signature SB(M') from the terminal 12B of the user B through the same (step S11).

Subsequently, the notarization device 11 fetches the public keys PA and PB of the respective users A and B (step S12), it verifies the digital signature SA(M) with the public key PA (step S13), and it decides if the digital signature SA(M) is valid (step S14). Here, when data obtained by decrypting the digital signature SA(M) with the public key PA are deemed the same as the transaction document M, the digital signature SA(M) is validated. If the digital signature SA(M) is not valid, the notarization device 11 notifies an error to the terminals 12A and 12B (step S19), whereupon it ends the processing.

If the digital signature SA(M) is valid, the notarization device 11 subsequently verifies the digital signature SB(M') with the public key PB (step S15), and it decides if the digital signature SB(M') is valid (step S16). Here, if the digital signature SB(M') is not valid, the notarization device 11 notifies an error to the terminals 12A and 12B (step S19), whereupon it ends the processing.

On condition that the digital signature SB(M') is valid, the notarization device 11 subsequently checks if the transaction documents M and M' agree (step S17). Unless these missives agree, the notarization device 11 notifies an error to the terminals 12A and 12B (step S19), whereupon it ends the processing.

When the transaction documents M and M' agree, the notarization device 11 subsequently checks if the date-and-time information T and transaction ID which are contained in the transaction document M agree with those issued by the device 11 itself (step S18). If the date-and-time information T or transaction ID is not proper, the notarization device 11 notifies an error to the terminals 12A and 12B (step S19), whereupon it ends the processing.

On condition that the date-and-time information T and the transaction ID are proper, the notarization device 11 subsequently concatenates the transaction document M and the digital signatures SA(M) and SB(M'), thereby to create the data {M, SA(M), SB(M')} (step S20 in FIG. 18).

Subsequently, the notarization device 11 fetches the secret key SN of the notary public N (step S21), and it creates the digital signature SN(M, SA(M), SB(M')) of the notary public N for the data {M, SA(M), SB(M')} by use of the fetched key (step S22). Besides, it retains the transaction document M and the digital signatures SA(M), SB(M') and SN(M, SA(M), SB(M')) (step S23).

Further, the notarization device 11 transmits these data M, SA(M), SB(M') and SN(M, SA(M), SB(M')) to the terminals 12A and 12B through the network 13 (step S24), whereupon it ends the processing.

Figure 19:
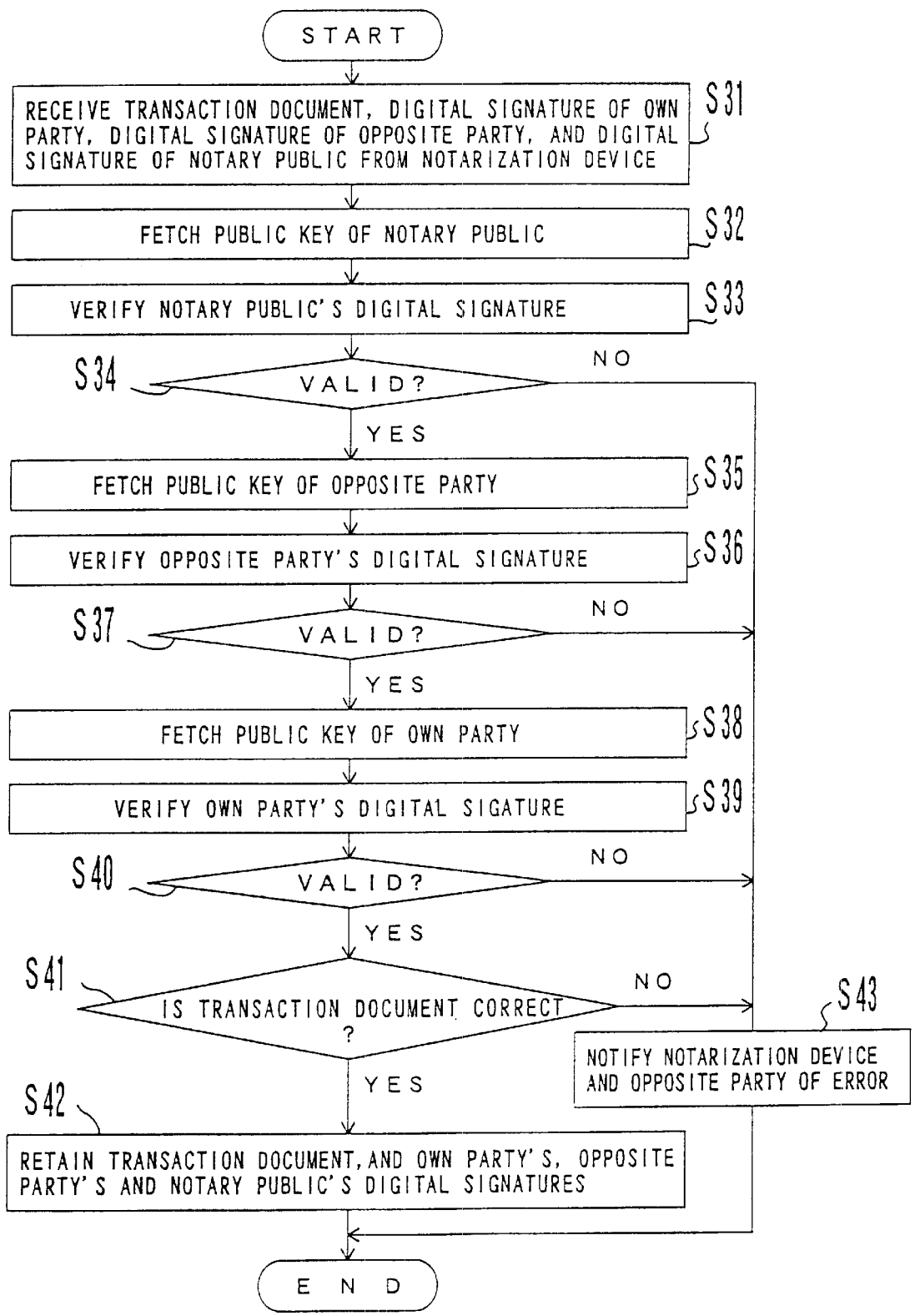
FIG. 19 is a flow chart showing the second processing of the user terminal.

FIG. 19 is the flow chart which corresponds to the processing P44 of the terminal 12A or the processing P44' of the terminal 12B. When the processing has been started in FIG. 19, the terminal 12A (or the terminal 12B) first receives the transaction document M and digital signatures SA(M), SB(M') and SN(M, SA(M), SB(M')) from the notarization device 11 through the network 13 (step S31).

Subsequently, the terminal 12A (or 12B) fetches the public key PN of the notary public N (step S32), it verifies the digital signature SN(M, SA(M), SB(M')) of the notary public N by use of the fetched key (step S33), and it decides if the notary public's digital signature is valid (step S34). Here, when data obtained by decrypting the digital signature SN(M, SA(M), SB(M')) with the public key PN are deemed the same as the data {M, SA(M), SB(M')}, this digital signature SN(M, SA(M), SB(M')) is validated.

If the digital signature of the notary public N is not valid, the terminal 12A (or 12B) notifies an error to the notarization device 11 and the terminal 12B (or 12A) (step S43), whereupon it ends the processing.

On the other hand, if the digital signature of the notary public N is valid, the terminal 12A (or 12B) subsequently fetches the public key PB (or PA) of the user B (or A) being the opposite party of the transaction (step S35), it verifies the digital signature SB(M') (or SA(M)) of the opposite party by use of the fetched key (step S36), and it decides if the opposite party's digital signature is valid (step S37). Unless the opposite party's digital signature is valid, the terminal 12A (or 12B) notifies an error to the notarization device 11 and the terminal 12B (or 12A) (step S43), whereupon it ends the processing.

On condition that the opposite party's digital signature is valid, the terminal 12A (or 12B) subsequently fetches the public key PA (or PB) of the user A (or B) being his/her own party (step S38), it verifies the digital signature SA(M) (or SB(M')) of the own party by use of the fetched key (step S39), and it decides if the own party's digital signature is valid (step S40). Unless the own party's digital signature is valid, the terminal 12A (or 12B) notifies an error to the notarization device 11 and the terminal 12B or (12A) (step S43), whereupon it ends the processing.

On condition that the own party's digital signature is valid, the terminal 12A (or 12B) subsequently checks if the transaction document M received from the notarization device 11 is proper (step S41). Here, if the received transaction document M is the same as the transaction document M (or M') created by the terminal 12A (or 12B) itself, it is decided to be proper. Unless the received transaction document M is proper, the terminal 12A (or 12B) notifies an error to the notarization device 11 and the terminal 12B (or 12A) (step S43), whereupon it ends the processing.

On condition that the received transaction document M is proper, the terminal 12A (or 12B) retains the transaction document M and the digital signatures SA(M), SB(M') and SN(M, SA(M), SB(M')) (step S42), whereupon it ends the processing.

Thus, the transaction missive, the digital signature of the user A, the digital signature of the user B and the digital signature of the notary public N are shared among the users A and B and the notary public N owing to the series of processing indicated in FIGS. 16, 17, 18 and 19. Similar flow charts can be written also for the other models of the transaction guarantee service and for the content guarantee service.

Upon receiving a request of reference to the transaction information from the terminal of any user who wants to confirm the contents of the transaction, the notarization device 11 sends the retained transaction document back to the terminal of the source of the request, together with the digital signature of the notary public N. Thus, the requester can refer to the contents of the transaction document guaranteed by the notary public N.

In the above, the identity guarantee service, date-and-time guarantee service, uniqueness guarantee service, delivery guarantee service, content guarantee service and transaction guarantee service have been described as the services which are incarnated in the transaction notarization system. The desirable aspects of performance of the transaction notarization system are considered to consist of the four basic models shown in FIGS. 12 through 15. In addition, an encryption model, a multiple-signature model and an interactive model are contrived as the application models of the transaction notarization system based on the basic models.

The encryption model is an aspect of performance in which all the information items to be transferred on the network in each of the basic models are encrypted with the public key of a receiving party or person, followed by the transmission of the encrypted information items. The receiving party decrypts the information items with his/her secret key, and thereafter subjects the decrypted information items to processing similar to that of each basic model. Such encryption of the information items lowers the possibility of the surreptitious use of the transaction information by any party or person other than the users A and B and the notary public N.

By the way, in the foregoing basic models, the users A and B create their digital signatures SA(M) and SB(M) on the basis of the transaction document M, respectively.

In contrast, in the multiple-signature model, one user creates his/her digital signature on the basis of information in which the transaction document M and the digital signature of another user are concatenated. By way of example, in a case where the user A has created the digital signature SA(M) earlier, the user B creates his/her digital signature SB(M, SA(M)) for the transaction document M and the digital signature SA(M). The notary public N creates his/her digital signature SN(M, SB(M, SA(M))) by further concatenating the digital signature SB(M, SA(M)) and the transaction document M.

According to the multiple-signature model, it can be clarified which of the users A and B has approved the transaction document M earlier. Also considered is an encryption model in which the information items created by the multiple-signature model are encrypted by use of the public key of a receiving party or person.

Meanwhile, in the second, third and fourth models shown in FIGS. 13, 14 and 15, respectively, the user A is the first sender of the transaction document M, and the user B merely respond on the basis of the received transaction document M.

With the interactive model, in the basic models, the transaction document M' is sent also from the user B in the same manner as in the first model shown in FIG. 12. When the flows of the information items are thus made bidirectional in interactive fashion, the statuses of the users A and B become equal. In this case, the notarization device 11 verifies and registers the information items sent from both the users A and B.

When the four basic models and the application models deriving from the basic models are mentioned, the variation of the models of the transaction notarization system becomes as illustrated in FIG. 20. Referring to the figure, an expression "Multiple signatures+Encryption", for example, signifies a composite model in which the multiple-signature model and the encryption model are conjointly employed. Besides, mark "○" denotes that the combination between the basic model of the corresponding column and the application model of the corresponding row (except the first row) is possible, while mark "X" denotes that such a combination is impossible.

As seen from FIG. 20, the transaction notarization system includes 23 (twenty-three) models. Further, a content non-disclosure model and an agreement-signature model are proposed as the modified models of the transaction notarization system.

The content non-disclosure model is a model in which the contents of a transaction are registered in the notarization device 11 without disclosing them to the notary public N. Concretely, this model is incarnated in such a way that, in the basic models and the application models, the plaintext P of the transactional contents is deleted from the information which is to be transmitted to the notarization device 11. Even in this case, the digital signatures created by the users A and B are sent to the notarization device 11, and hence, they can be verified by and registered in the notarization device 11.

On the other hand, the agreement-signature model is a model in which the digital signatures of agreeing parties or persons who are other than the users A and B and the notary public N are affixed to the transaction information to-be-retained. When this model is adopted, it is permitted to prove that the users other than the interested parties of the transaction have approved the fact and contents of the transaction.

Figure 21:
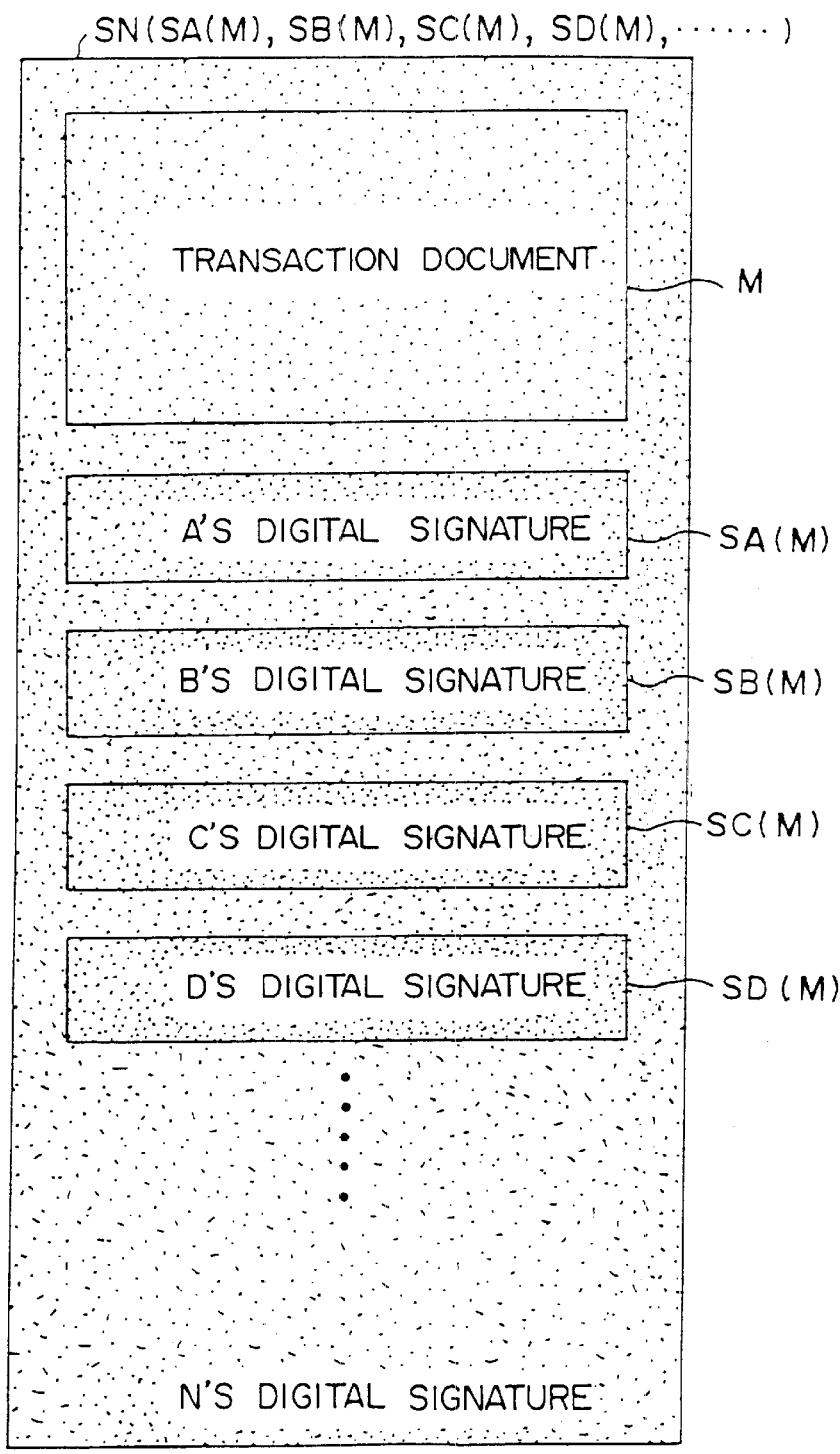
FIG. 21 is a diagram showing shared information which bears agreement signatures.

FIG. 21 shows an example of the shared information which bears such agreement signatures. In the illustrated example, the digital signatures SC(M), SD(M), . . . of the users C, D, . . . being the agreeing parties are affixed to the transaction document M, besides the digital signatures SA(M) and SB(M) of the respective users A and B. On the basis of information obtained by concatenating these information items, the digital signature SN(SA(M), SB(M), SC(M), SD(M), . . . ) of the notary public N is created.

With such an agreement-signature model, in a case where the users C, D, et al. are the interested parties of the transaction, the transaction notarization system automatically proves items on the transactions among the three or more interested parties.

According to the present invention, in a network environment wherein a plurality of information processors are interconnected, items on a transaction which is carried on between at least two users, such as the contents of the transaction, the date and time of the transaction and the identity of the opposite party of the transaction, can be objectively proved by a third party. Accordingly, the safety of the transaction in the network environment is automatically guaranteed.

What is claimed is:

1. A transaction proof apparatus for processing information on a transaction which is carried on between at least two users, comprising:

a communication device, connected to a communication network, receiving from the network digital signature data of a first user and digital signature data of a second user for transaction document data which contains information on the transaction between the first and second users, the digital signature data of the first user and the digital signature data of the second user indicating approval for the information on the transaction;

a processing device verifying the digital signature data of said first user and the digital signature data of said second user and affixing a digital signature of a third party to data containing at least one of the digital signature data of said first user and the digital signature data of said second user, thereby to generate digital signature data of the third party;

a storage device storing therein said transaction document data, said digital signature data of said first user, said digital signature data of said second user, and said digital signature data of the third party; and a proving device proving in response to a request that the transaction was carried out between the first and second users by using data stored in the storage device, wherein said communication device sends the digital signature data of the third party to the first and second users through the network, thereby a combination of the transaction document data, the digital signature data of the first user, the digital signature data of the second user, and the digital signature data of the third party is retained by the transaction proof apparatus and the first and second users.

2. A transaction proof apparatus according to claim 1, wherein:

said communication device further receives the transaction document data from said network, and said processing device verifies said digital signature data of said first user and said digital signature data of said second user by use of said transaction document data and stores said transaction document data in said storage device together with said digital signature data of said first user and said digital signature data of said second user.

3. A transaction proof apparatus according to claim 2, further comprising:

a date-and-time issuance device issuing date-and-time information which expresses at least one of date and time of said transaction, wherein said communication device receives said transaction document data which contain the date-and-time information, and said processing device checks if said date-and-time information contained in said transaction document data agrees with the date-and-time information issued by said date-and-time issuance device.

4. A transaction proof apparatus according to claim 2, further comprising an identifier issuance device for issuing identifier information of said transaction, wherein:

said communication device receives said transaction document data which contain the identifier information, and said processing device checks if said identifier information contained in said transaction document data agrees with the identifier information issued by said identifier issuance device.

5. A transaction proof apparatus according to claim 2, wherein:

said communication device receives a request for reference to said transaction document data from said network, said processing device obtains said transaction document data from said storage device in compliance with the reference request, and said communication device sends contents of said transaction document data to a source of said reference request through said network.

6. A transaction proof apparatus according to claim 1, wherein said communication device sends said digital signature data of said third party to said first and second users through said network.

7. A transaction proof apparatus according to claim 1, wherein:

said communication device further receives a digital signature of an agreeing party for the transaction document data from said network, and said processing device stores the digital signature of the agreeing party in said storage device together with said digital signature data of said first user and said digital signature data of said second user.

8. A transaction proof apparatus according to claim 1, wherein:

said communication device receives an encrypted digital signature data of said first user and an encrypted digital signature data of said second user, and said processing device decrypts the encrypted digital signature data of said first and second users and thereafter verifies the decrypted digital signature data.

9. A transaction proof apparatus for processing information on a transaction which is carried on between at least two users, comprising:

a communication device, connected to a communication network, receiving from the network digital signature data of a second user created for digital signature data of a first user for transaction document data which contains information on the transaction between the first and second users, the digital signature data of the first user and the digital signature data of the second user indicating approval for the information on the transaction;

a processing device verifying the digital signature data of said second user and affixing a digital signature of a third party to data containing the digital signature data of said second user, thereby to generate digital signature data of the third party;

a storage device storing said transaction document data, said digital signature data of said second user, and said digital signature data of the third party therein; and a proving device proving in response to a request that the transaction was carried out between the first and second users by using data stored in the storage device, wherein said communication device sends the digital signature data of the third party to the first and second users through the network, thereby a combination of the transaction document data, the digital signature data of the first user, the digital signature data of the second user, and the digital signature data of the third party is retained by the transaction proof apparatus and the first and second users.

10. A transaction proof apparatus for processing information on a transaction which is carried on between at least two users, comprising:

a communication device, connected to a communication network, receiving from the network transaction information of a first user and transaction information of a second user which contains information on the transaction between the first and second users, the transaction information of the first user and the transaction information of the second user indicating approval for the information on the transaction;

a processing device confirming that the transaction information of said first user and the transaction information of said second user having identical contents and affixing a digital signature of a third party to data containing at least one of the transaction information of said first user and the transaction information of said second user, thereby to generate digital signature data of the third party;

a storage device storing the transaction information of said first and second users and said digital signature data of the third party therein; and a proving device proving in response to a request that the transaction was carried out between the first and second users by using data stored in the storage device, wherein said communication device sends the digital signature data of the third party to the first and second users through the network, thereby a combination of the transaction information of the first user, the transaction information of the second user, and the digital signature data of the third party is retained by the transaction proof apparatus and the first and second users.

11. A terminal device for processing information on a transaction which is carried on between at least two users, comprising:

a processing device creating digital signature data of a first user for transaction document data which contains information on the transaction between the first and a second user, the digital signature data of the first user indicating approval for the information on the transaction;

a communication device, connected to a communication network, transmitting the transaction document data and the digital signature data of said first user to a third party through the network, and receiving digital signature data of the second user for the transaction document data which have been verified with the transaction document data by the third party and digital signature data of the third party for data which contain at least one of the digital signature data of said first user and the digital signature data of said second user, from said third party through said network, the digital signature data of the second user indicating approval for the information on the transaction; and a storage device storing the transaction document data, the digital signature data of said first user, the digital signature data of said second user, and the digital signature data of the third party, wherein a combination of the transaction document data, the digital signature data of the first user, the digital signature data of the second user, and the digital signature data of the third party is retained by the first and second users and the third party.

12. A terminal device according to claim 11, wherein said communication device transmits said transaction document data to said third party through said network, receives said digital signature data of said second user verified with said transaction document data by said third party, and stores said transaction document data in said storage device together with said digital signature data of said first user and said digital signature data of said second user.

13. A terminal device according to claim 13, wherein said processing device verifies the digital signature data of said third party and stores the verified data in said storage device.

14. A terminal device for processing information on a transaction which is carried on between at least two users, comprising:
 a processing device creating digital signature data of a first user for transaction document data which contains information on the transaction between the first user and a second user, the digital signature data of the first user indicating approval for the information on the transaction;
 a communication device, connected to a communication network, receiving digital signature data of the second user for the transaction document data from said second user through the network, digital signature data of the second user indicating approval for the information on the transaction, transmitting the digital signature data of said first user and the digital signature data of said second user to a third party through said network, and receiving digital signature data of the third party for data which contains at least one of the digital signature data of said first user and the digital signature data of said second user from the network; and
 a storage device storing said transaction document data, said digital signature data of said first user, said digital signature data of said second user, and the digital signature data of the third party,
 wherein a combination of the transaction document data, the digital signature data of the first user, the digital signature data of the second user, and the digital signature data of the third party is retained by the first and second users and the third party.

15. A terminal device according to claim 14, wherein said processing device verifies the digital signature data of said third party and stores verified data in said storage device.

16. A terminal device for processing information on a transaction which is carried on between at least two users, comprising:
 a processing device creating transaction information of a first user which contains information on the transaction between said first user and a second user, the transaction information of the first user indicating approval for the information on the transaction;
 a communication device, connected to a communication network, transmitting the transaction information of said first user to a third party through the network, receiving transaction information of said second user and digital signature data of the third party for data which contains at least one of the transaction information of said first user and the transaction information of said second user, from said third party through said network, the transaction information of the second user indicating approval for the information on the transaction; and a storage device storing the received transaction information and the digital signature data of the third party,
 wherein a combination of the transaction information of the first user, the transaction information of the second user, and the digital signature data of the third party is retained by the first and second users and the third party.

17. A terminal device for processing information on a transaction which is carried on between at least two users, comprising:
 a processing device creating transaction information of a first user which contains information on the transaction between said first user and a second user, the transaction information of the first user indicating approval for the information on the transaction;
 a communication device, connected to a communication network, receiving transaction information of said second user from said second user through the network, the transaction information of the second user indicating approval for the information on the transaction, transmitting the transaction information of said first user and the transaction information of said second user to a third party through said network, and receiving digital signature data of the third party for data which contains at least one of the transaction information of said first user and the transaction information of said second user from the network; and
 a storage device storing said transaction information of said first user, the transaction information of said second user, and the digital signature data of the third party,
 wherein a combination of the transaction information of the first user, the transaction information of the second user, and the digital signature data of the third party is retained by the first and second users and the third party.

18. A transaction proof system for processing information on a transaction which is carried on between at least two users, comprising:
 a first creation device creating digital signature data of a first user for transaction document data which contains information on the transaction between the first user and a second user, the digital signature data of the first user indicating approval for the information on the transaction;
 a second creation device creating digital signature data of the second user for the transaction document data, the digital signature data of the second user indicating approval for the information on the transaction;
 a communication device, connected to a communication network, receiving the digital signature data of said first user and the digital signature data of said second user from the network;
 a processing device verifying said digital signature data of said first user and said digital signature data of said second user;
 a third creation device creating digital signature data of the third party for data which contains at least one of the digital signature data of said first user and the digital signature data of said second user;
 a first storage device, to be referred to by said first user, storing said digital signature data of said first user, said digital signature data of said second user, and the digital signature data of the third party therein as a guarantee of the transaction;

a second storage device, to be referred to by said second user, storing said digital signature data of said first user, said digital signature data of said second user, and the digital signature data of the third party therein as a guarantee of the transaction;

a third storage device, to be referred to by a third party, storing said digital signature data of said first user, said digital signature data of said second user, and the digital signature data of the third party therein in proof of the transaction; and a proving device proving in response to a request that the transaction was carried out between the first user and the second user, by using data stored in said third storage device.

19. A computer-readable storage medium which, when used by a computer for processing information on a transaction that is carried on between at least two users, causes the computer to perform the processes of:

receiving from a communication network, digital signature data of a first user and digital signature data of a second user for transaction document data which contains information on the transaction between the first and second users, the digital signature data of the first user and the digital signature data of the second user indicating approval for the information on the transaction;

verifying the digital signature data of said first user and the digital signature data of said second user and affixing a digital signature of a third party to data containing the digital signature data of said second user, thereby to generate digital signature data of the third party;

storing said transaction document data, said digital signature data of said first user, said digital signature data of said second user, and said digital signature data of the third party therein; and proving in response to a request that the transaction was carried out between the first user and the second user, by using the stored data, wherein the digital signature data of the third party is sent to the first and second users, thereby a combination of the transaction document data, the digital signature data of the first user, the digital signature data of the second user, and the digital signature data of the third party is retained for the proving operation.

20. A computer-readable storage medium which, when used by a computer for processing information on a transaction that is carried on between at least two users, causes the computer to perform the processes of:

creating digital signature data of a first user for transaction document data which contains information on the transaction between said first user and a second user, the digital signature data of the first user indicating approval for the information on the transaction;

transmitting the transaction document data and the digital signature data of said first user to a third party through a communication network;

receiving digital signature data of said second user for the transaction document data which has been verified with the transaction document data by the third party and digital signature data of the third party for data which contain at least one of the digital signature data of said first user and the digital signature data of said second user, from said third party through the network, the digital signature data of the second user indicating approval for the information on the transaction; and storing said transaction document data, said digital signature data of said first user and the digital signature data of said second user as a guarantee of the transaction, and the digital signature data of the third party, wherein a combination of the transaction document data, the digital signature data of the first user, the digital signature data of the second user, and the digital signature data of the third party is retained by the first and second users and the third party.

21. A computer-readable storage medium which, when used by a computer for processing information on a transaction that is carried on between at least two users, causes the computer to perform the processes of:

creating digital signature data of a first user for transaction document data which contains information on the transaction between said first user and a second user, the digital signature data of the first user indicating approval for the information on the transaction;

receiving digital signature data of said second user for the transaction document data, from said second user through a communication network, digital signature data of the second user indicating approval for the information on the transaction;

transmitting the digital signature data of said first user and the digital signature data of said second user to a third party through the network, and receiving digital signature data of the third party for data which contains at least one of the digital signature data of said first user and the digital signature data of said second user from the network; and storing said transaction document data, said digital signature data of said first user and said digital signature data of said second user as a guarantee of the transaction and the digital signature data of the third party, wherein a combination of the transaction document data, the digital signature data of the first user, the digital signature data of the second user, and the digital signature data of the third party is retained by the first and second users and the third party.

22. A transaction proof method for processing information on a transaction which is carried on between at least two users, comprising:

creating transaction document data which contains information on the transaction between a first user and a second user;

creating digital signature data of said first user and digital signature data of said second user for the transaction document data, the digital signature data of the first user and the digital signature data of the second user indicating approval for the information on the transaction;

transmitting the digital signature data of said first user and the digital signature data of said second user to a third party through a communication network, and receiving digital signature data of the third party for data which contains at least one if the digital signature data of said first user and the digital signature data of said second user from the network;

verifying said digital signature data of said first user and said digital signature data of said second user;

preserving said transaction document data, said digital signature data of said first user, said digital signature data of said second user and the digital signature data of the third party; and proving in response to a request that the transaction was carried out between the first and second users, by using the preserved data, wherein a combination of the transaction document data, the digital signature data of the first user, the digital signature data of the second user, and the digital signature data of the third party is retained by the first and second users and the third party.

23. A transaction proof apparatus comprising:

a communication device receiving a private-key encrypted transaction document from a first user and a private-key encrypted transaction document from a second user;

a processing device decrypting both the encrypted transaction document from the first user and the encrypted transaction document from the second user, and verifying that both decrypted documents are identical; and a storage device, on condition that both decrypted documents are identical, storing data proving that both users agreed on the transaction, said data being stored for future retrieval to a requestor.

24. A process for proving a transaction to a requestor comprising:

encrypting a first transaction document with a first user private key;

sending the encrypted first transaction document to a proving apparatus;

encrypting a second transaction document with a second user private key;

sending the encrypted second transaction document to the proving apparatus;

decrypting the first encrypted transaction document and the second encrypted transaction document by the proving apparatus;

comparing the first decrypted transaction document and the second decrypted transaction document, and if identical then storing transaction data verifying the transaction for future retrieval; and delivering the transaction data to the requestor.

25. A transaction proof apparatus for processing information on a transaction which is carried on between at least two users, comprising:

a communication device, connected to a communication network, receiving from the network digital signature data of a first user in conjunction with a first transaction document data which contains information on the transaction between the first and second users, and receiving from the network digital signature data from a second user in conjunction with a second transaction document data which contains information on the transaction between the first and second users, the digital signature data of the first user and the digital signature data of the second user indicating approval for the information on the transaction;

a processing device verifying the digital signature data of said first user and the digital signature data of said second user;

a storage device storing therein said digital signature data of said first user and said digital signature data of said second user in proof of the transaction if the received first transaction document data is identical to the received second transaction document data; and a proving device proving in response to a request that the transaction was carried out between the first and second users by using data stored in the storage device.

* * * * *